US012445791B2

(12) United States Patent
Seefeldt et al.

(10) Patent No.: US 12,445,791 B2
(45) Date of Patent: Oct. 14, 2025

(54) SPATIAL AUDIO RENDERING ADAPTIVE TO SIGNAL LEVEL AND LOUDSPEAKER PLAYBACK LIMIT THRESHOLDS

(71) Applicant: Dolby Laboratories Licensing Corporation, San Francisco, CA (US)

(72) Inventors: Alan J. Seefeldt, Alameda, CA (US); Joshua B. Lando, Mill Valley, CA (US); Timothy Alan Port, Drummoyne (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 18/998,247

(22) PCT Filed: Jul. 21, 2023

(86) PCT No.: PCT/US2023/028378

§ 371 (c)(1),
(2) Date: Jan. 24, 2025

(87) PCT Pub. No.: WO2024/025803

PCT Pub. Date: Feb. 1, 2024

(65) Prior Publication Data

US 2025/0267417 A1 Aug. 21, 2025

Related U.S. Application Data

(60) Provisional application No. 63/505,652, filed on Jun. 1, 2023, provisional application No. 63/413,923, filed
(Continued)

(51) Int. Cl.
*H04S 7/00* (2006.01)
*H04R 5/02* (2006.01)

(52) U.S. Cl.
CPC ................ *H04S 7/30* (2013.01); *H04R 5/02* (2013.01)

(58) Field of Classification Search
None
See application file for complete search history.

(56) References Cited

U.S. PATENT DOCUMENTS 9,489,953 B2 * 11/2016 Christoph ................ H04R 3/00
9,712,939 B2 * 7/2017 Mateos Sole ............. H04S 7/30
(Continued)

FOREIGN PATENT DOCUMENTS

EP 2830334 A1 1/2015
JP 2006262324 A 9/2006
(Continued)

OTHER PUBLICATIONS

Cagdas Tuna et al., 3D Room Geometry Inference Using a Linear Loudspeaker Array and a Single Microphone, Source: IEEE/ACM Transactions on Audio, Speech, and Language Processing, vol. 28, pp. 1729-1744, 2020, 16 pages.
(Continued)

*Primary Examiner* — Duc Nguyen
*Assistant Examiner* — Assad Mohammed

(57) ABSTRACT

Rendering audio signals may involve a mapping for each audio signal to the loudspeaker signals computed as a function of an audio signal's intended perceived spatial position, physical positions associated with the loudspeakers and a time- and frequency-varying representation of loudspeaker signal level relative to a maximum playback limit of each loudspeaker. Each mapping may be computed to approximately achieve the intended perceived spatial position of an associated audio signal when the loudspeaker signals are played back. A representation of loudspeaker signal level relative to a maximum playback limit may be computed for each audio signal. The mapping of an audio signal into a particular loudspeaker signal may be reduced as loudspeaker signal level relative to a maximum playback limit increases above a threshold, while the mapping may be
(Continued)

increased into one or more other loudspeakers for which the maximum playback limits are less than a threshold.

24 Claims, 12 Drawing Sheets

Related U.S. Application Data on Oct. 6, 2022, provisional application No. 63/392, 794, filed on Jul. 27, 2022.

(56) References Cited

U.S. PATENT DOCUMENTS

| | | | | |
|---|---|---|---|---|
| 9,952,827 | B2 * | 4/2018 | Gattis | G06F 3/165 |
| 10,111,022 | B2 | 10/2018 | Seefeldt | |
| 11,070,932 | B1 | 7/2021 | Prospero | |
| 11,172,318 | B2 | 11/2021 | Seefeldt | |
| 11,290,821 | B2 | 3/2022 | Walther | |
| 12,003,933 | B2 | 6/2024 | Seefeldt | |
| 12,022,271 | B2 | 6/2024 | Seefeldt | |
| 2014/0362998 | A1 | 12/2014 | Christoph | |
| 2017/0300289 | A1 | 10/2017 | Gattis | |
| 2021/0265966 | A1 | 8/2021 | Port | |

FOREIGN PATENT DOCUMENTS

| | | | |
|---|---|---|---|
| RU | 2735652 | C2 | 11/2020 |
| WO | 2006100972 | A1 | 9/2006 |
| WO | 2007135581 | A2 | 11/2007 |
| WO | 2010022453 | A1 | 3/2010 |
| WO | 2021021460 | A1 | 2/2021 |
| WO | 2022064905 | A1 | 3/2022 |

OTHER PUBLICATIONS

Dmitry N. Zotkin et al., Rendering localized spatial audio in a virtual auditory space, Source: IEEE Transactions on Multimedia, vol. 6, No. 4, pp. 553-564, Aug. 2004, 12 pages.

* cited by examiner

1200

SPATIAL AUDIO RENDERING ADAPTIVE TO SIGNAL LEVEL AND LOUDSPEAKER PLAYBACK LIMIT THRESHOLDS

CROSS-REFERENCE TO RELATED APPLICATIONS

This application is the U.S. National stage entry of International Patent Application No. PCT/US2023/028378, filed Jul. 21, 2023, which claims the benefit of priority to U.S. Provisional Patent Application No. 63/392,794 filed Jul. 27, 2022, U.S. Provisional Patent Application No. 63/413,923 filed Oct. 6, 2022 and U.S. Provisional Patent Application No. 63/505,652 filed Jun. 1, 2023, each of which is incorporated by reference in its entirety.

TECHNICAL FIELD

The disclosure pertains to systems and methods for rendering audio for playback by a set of speakers.

BACKGROUND

Audio devices, including but not limited to smart audio devices, have been widely deployed and are becoming common features of many homes. Although existing systems and methods for controlling audio devices provide benefits, improved systems and methods would be desirable.

NOTATION AND NOMENCLATURE

Throughout this disclosure, including in the claims, "speaker" and "loudspeaker" are used synonymously to denote any sound-emitting transducer (or set of transducers) driven by a single speaker feed. A typical set of headphones includes two speakers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the term "couples" or "coupled" is used to mean either a direct or indirect connection. Thus, if a first device couples to a second device, that connection may be through a direct connection, or through an indirect connection via other devices and connections.

Herein, we use the expression "smart audio device" to denote a smart device which is either a single purpose audio device or a virtual assistant (e.g., a connected virtual assistant). A single purpose audio device is a device (e.g., a TV or a mobile phone) including or coupled to at least one microphone (and optionally also including or coupled to at least one speaker) and which is designed largely or primarily to achieve a single purpose. Although a TV typically can play (and is thought of as being capable of playing) audio from program material, in most instances a modern TV runs some operating system on which applications run locally, including the application of watching television. Similarly, the audio input and output in a mobile phone may do many things, but these are serviced by the applications running on the phone. In this sense, a single purpose audio device having speaker(s) and microphone(s) is often configured to run a local application and/or service to use the speaker(s) and microphone(s) directly. Some single purpose audio devices may be configured to group together to achieve playing of audio over a zone or user configured area.

A virtual assistant (e.g., a connected virtual assistant) is a device (e.g., a smart speaker or voice assistant integrated device) including or coupled to at least one microphone (and optionally also including or coupled to at least one speaker) and which may provide an ability to utilize multiple devices (distinct from the virtual assistant) for applications that are in a sense cloud enabled or otherwise not implemented in or on the virtual assistant itself. Virtual assistants may sometimes work together, e.g., in a discrete and conditionally defined way. For example, two or more virtual assistants may work together in the sense that one of them, for example, the one which is most confident that it has heard a wakeword, responds to the word. The connected devices may form a sort of constellation, which may be managed by one main application which may be (or implement) a virtual assistant.

Herein, "wakeword" is used in a broad sense to denote any sound (e.g., a word uttered by a human, or some other sound), where a smart audio device is configured to awake in response to detection of ("hearing") the sound (using at least one microphone included in or coupled to the smart audio device, or at least one other microphone). In this context, to "awake" denotes that the device enters a state in which it awaits (i.e., is listening for) a sound command. In some instances, what may be referred to herein as a "wakeword" may include more than one word, e.g., a phrase.

Herein, the expression "wakeword detector" denotes a device configured (or software that includes instructions for configuring a device) to search continuously for alignment between real-time sound (e.g., speech) features and a trained model. Typically, a wakeword event is triggered whenever it is determined by a wakeword detector that the probability that a wakeword has been detected exceeds a predefined threshold. For example, the threshold may be a predetermined threshold which is tuned to give a good compromise between rates of false acceptance and false rejection. Following a wakeword event, a device might enter a state (which may be referred to as an "awakened" state or a state of "attentiveness") in which it listens for a command and passes on a received command to a larger, more computationally-intensive recognizer.

SUMMARY

At least some aspects of the present disclosure may be implemented via methods, such as audio processing methods. In some instances, the methods may be implemented, at least in part, by a control system such as those disclosed herein. Some methods may involve receiving, by a control system and via an interface system, audio data. The audio data may include one or more audio signals and associated spatial data. The spatial data may indicate an intended perceived spatial position corresponding to an audio signal. In some examples, the intended perceived spatial position may correspond with a channel of a channel-based audio format, may correspond with metadata, or may correspond with both the channel and the metadata. Some methods may involve rendering, by the control system, the audio data for reproduction via a set of two or more loudspeakers of an environment, to produce loudspeaker signals. Some methods may involve providing, via the interface system, the loudspeaker signals to at least two loudspeakers of the set of loudspeakers of the environment.

According to some examples, rendering each of the one or more audio signals included in the audio data may involve a mapping for each audio signal to the loudspeaker signals. The mapping may, in some instances, be a time- and frequency-varying mapping. In some examples, the mapping for each audio signal may be computed as a function of an audio signal's intended perceived spatial position, physical positions associated with the loudspeakers and a time- and frequency-varying representation of loudspeaker signal level relative to a maximum playback limit of each loudspeaker. According to some examples, each mapping may be computed to approximately achieve the intended perceived spatial position of an associated audio signal when the loudspeaker signals are played back over the two or more corresponding loudspeakers located at associated loudspeaker positions. In some examples, a representation of loudspeaker signal level relative to a maximum playback limit may be computed for each audio signal as a function of one or more of the audio signals and their perceived spatial positions. According to some examples, the mapping of an audio signal into a particular loudspeaker signal may be reduced as the representation of loudspeaker signal level relative to a maximum playback limit increases above a threshold, while the mapping may be increased into one or more other loudspeakers for which the representations of signal level relative to the maximum playback limits of one or more other loudspeakers are less than a threshold.

In some examples, the mapping may be computed over an entire audible frequency range (for example, an audible frequency range for human beings). However, in some examples, the mapping may be computed over a subset of an audible frequency range.

According to some examples, mapping may involve minimizing a cost function including a first term that models how closely the intended perceived spatial position may be achieved as a function of mapping an audio signal into loudspeaker signals, and a second term that assigns a cost to activating each of the loudspeakers. In some such examples, the cost of activating each loudspeaker may be based, at least in part, on a function of the representation of loudspeaker signal level relative to the maximum playback limit.

In some examples, the representation of loudspeaker signal level relative to the maximum playback limit may correspond to one or more of a digital signal level, a limiter gain, or an acoustic signal level. According to some examples, the representation of loudspeaker signal level relative to the maximum playback limit may be computed as a difference between a level estimate for each audio signal and playback limit thresholds for each loudspeaker. In some examples, the level estimate for each audio signal may be based, at least in part, on a zone-based rendering of all the audio signals. According to some examples, the level estimate for each audio signal may be based, at least in part, on previously-computed loudspeaker signals. In some examples, the level estimate for each audio signal may be further dependent upon a participation of each loudspeaker in a plurality of spatial zones. Some methods may involve smoothing the level estimate for each audio signal across time, across frequency, or across both time and frequency.

According to some examples, the mapping from audio signal to loudspeaker signals may be determined by querying a data structure indexed by the intended perceived spatial position and level estimate for each audio signal. In some examples, the mapping from audio signal to loudspeaker signals may be determined by interpolating from a set of pre-computed speaker mappings. In some such examples, the set may be indexed by the intended perceived spatial position and level estimate for each audio signal. In some examples, the set may be indexed by the intended level estimate for each audio signal.

In some examples, the level estimate for each audio signal may be represented as a broadband gain multiplied with a spectral shape. According to some examples, the spectral shape may be selected from a plurality of spectral shapes. In some such examples, each spectral shape of the plurality of spectral shapes may correspond to a content type.

According to some examples, reducing a mapping into one loudspeaker and increasing a mapping into another loudspeaker may occur gradually as the representation of signal level relative to a maximum playback level increases above a threshold.

In some examples, approximately achieving the intended perceived spatial position of an associated audio signal may involve minimizing a difference between a perceived spatial position and the intended perceived spatial position, given available loudspeakers and associated loudspeaker positions. According to some examples, approximately achieving the intended perceived spatial position of an associated audio signal may involve minimizing a cost function.

Some methods may involve controlling a degree of reduction of mapping into one loudspeaker and an increase of mapping into another loudspeaker according to one or more of an audio format, a codec, or metadata. Some methods may involve controlling a degree of reduction of mapping into one loudspeaker and an increase of mapping into another loudspeaker according to a knee parameter.

Some or all of the operations, functions and/or methods described herein may be performed by one or more devices according to instructions (e.g., software) stored on one or more non-transitory media. Such non-transitory media may include one or more memory devices such as those described herein, including but not limited to one or more random access memory (RAM) devices, read-only memory (ROM) devices, etc. Accordingly, some innovative aspects of the subject matter described in this disclosure can be implemented in one or more non-transitory media having software stored thereon.

At least some aspects of the present disclosure may be implemented via apparatus. For example, one or more devices may be capable of performing, at least in part, the methods disclosed herein. In some implementations, an apparatus may include an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION OF EMBODIMENTS

Figure 1:
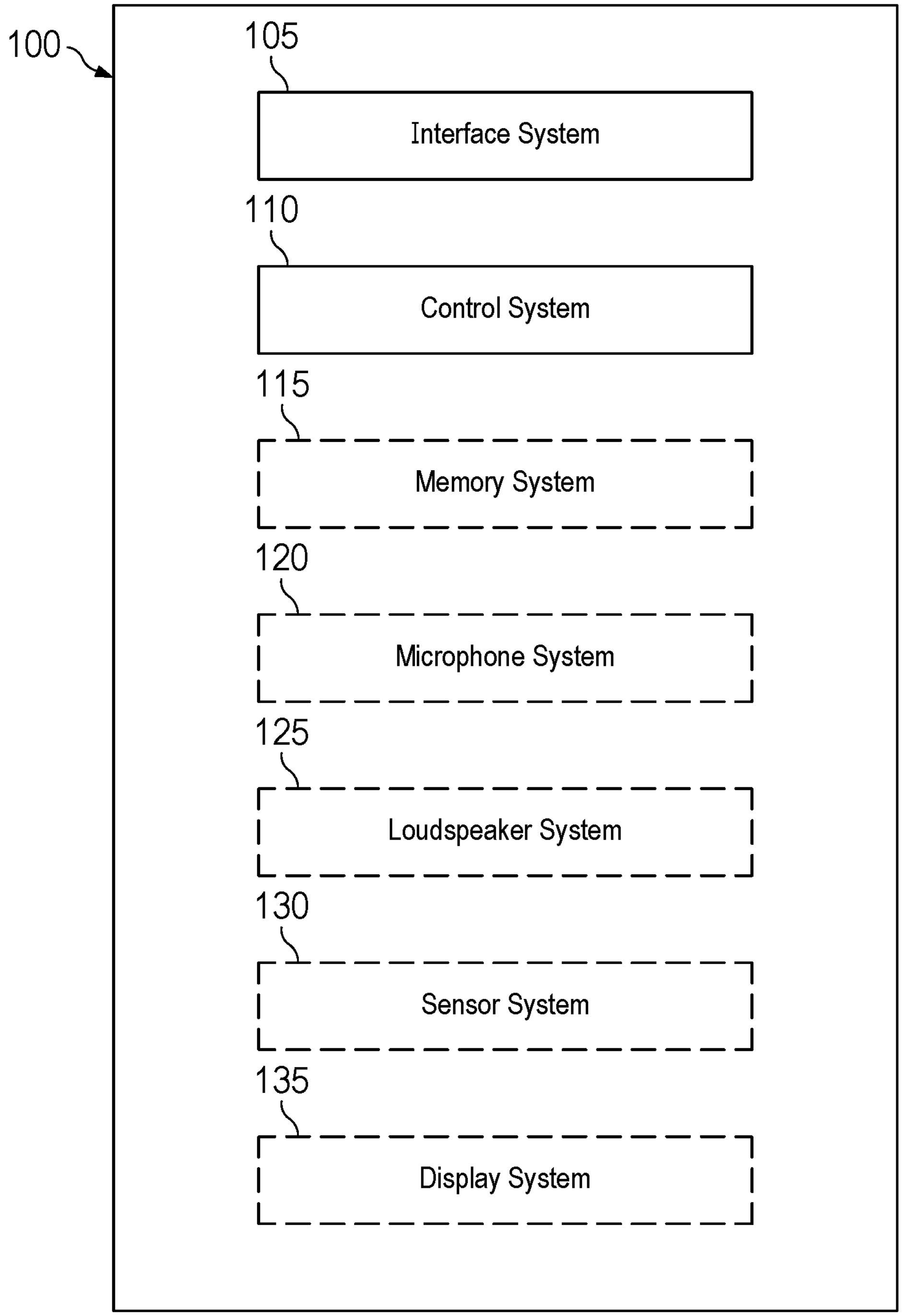
FIG. 1 is a block diagram that shows examples of components of an apparatus capable of implementing various aspects of this disclosure.

Playback of spatial audio in a consumer environment has typically been tied to a prescribed number of loudspeakers placed in prescribed positions, such as positions corresponding to Dolby 5.1 or 7.1 surround sound. In these cases, content is authored specifically for the associated loudspeakers and encoded as discrete channels, one for each loudspeaker (e.g., Dolby Digital™, Dolby Digital Plus™, etc.) More recently, immersive, object-based spatial audio formats have been introduced (such as Dolby Atmos™) which break this association between the content and specific loudspeaker locations. Instead, the content may be described as a collection of individual audio objects, each with possibly time varying metadata describing the desired perceived location of said audio objects in three-dimensional space and, in some examples, other properties of the audio object. At playback time, the audio content is transformed into loudspeaker feeds by a renderer which adapts to the number and location of loudspeakers in the playback system. Many such renderers, however, still constrain the locations of the set of loudspeakers to be one of a set of prescribed layouts (for example Dolby 3.1.2, 5.1.2, 7.1.4, 9.1.6, etc. with Dolby Atmos™).

Moving beyond such constrained rendering, methods have been developed which allow object-based audio to be rendered flexibly over a truly arbitrary number of loudspeakers placed at arbitrary positions. These methods generally require that the renderer have knowledge of the number and physical locations of the loudspeakers in the listening space. For such a system to be practical for the average consumer, an automated method for locating the loudspeakers would be desirable. One such method relies on the use of a multitude of microphones, possibly co-located with the loudspeakers. By playing audio signals through the loudspeakers and recording with the microphones, the distance between each loudspeaker and microphone can be estimated. From these distances the locations of both the loudspeakers and microphones can subsequently be deduced.

Simultaneous to the introduction of object-based spatial audio in the consumer space has been the rapid adoption of so-called “smart speakers”, such as the Amazon Echo™ line of products. The tremendous popularity of these devices can be attributed to their simplicity and the convenience afforded by wireless connectivity and an integrated voice interface (Amazon’s Alexa™, for example), but the sonic capabilities of these devices has generally been limited, particularly with respect to spatial audio. In most cases these devices are constrained to mono or stereo playback. However, combining the aforementioned flexible rendering and auto-location technologies with a plurality of orchestrated smart speakers may yield a system with very sophisticated spatial playback capabilities and that still remains extremely simple for the consumer to set up. A consumer can place as many or few of the speakers as desired, wherever is convenient, without the need to run speaker wires due to the wireless connectivity, and the built-in microphones can be used to automatically locate the speakers for the associated flexible renderer.

One approach for rendering spatial audio over a set of loudspeakers is to map each component signal of the spatial mix across the set of loudspeakers based purely on assumed or measured locations of the loudspeakers along with an intended perceived location of the component signal. Such an approach is described in U.S. Pat. Nos. 9,712,939 and 11,172,318, which are hereby incorporated by reference. If variations in playback capabilities exist across the set of loudspeakers, the perceived quality of the spatial rendering may suffer when using this approach. Many smaller loudspeakers start to distort and then hit their excursion limit as playback level increases, particularly for lower frequencies.

To reduce such distortion, each loudspeaker may implement dynamics processing which constrains the playback level below these limits, in some examples in a manner that varies across frequency. When spatial audio rendered using the above-described methods is then played over the set of loudspeakers, each loudspeaker applies its dynamics processing independently, resulting in possibly very different relative modifications to the audio on different speaker feeds. For example, less-capable loudspeakers will generally attenuate the audio more than more capable loudspeakers at high playback levels. These variations in processing across loudspeakers may dynamically shift the spatial balance of the mix in a perceptually distracting manner and also may disturb the overall relative balance of the mix. For example, the front sound-stage might overall be attenuated relative to the rear sound-stage if the front sound-stage is reproduced largely by less-capable loudspeakers.

The present assignee has developed methods to mitigate some of these issues by intelligently combining the playback limit thresholds across loudspeakers and applying them in spatial zones across the entire spatial audio mixer prior to rendering the mix to loudspeaker feeds. Some examples are disclosed herein. The zones may be chosen to prevent perceptually distracting imaging shifts from left to right while still allowing some independence in processing between parts of the audio mix. Some zone-based methods involve four zones: front, center, surround, and overhead.

These zone-based methods do help stabilize the spatial imaging of the rendered audio. However, in some instances, such zone-based methods can have the undesirable effect of constraining the overall playback level towards the least capable devices across the set of loudspeakers.

The present disclosure provides improved rendering methods, including some improved zone-based methods, that better utilize the more capable loudspeakers in the set of loudspeakers. Improved methods for rendering spatial audio are disclosed wherein the dynamic signal level of the spatial audio mix is additionally considered when mapping each component signal of the mix to loudspeaker feed signals. In some examples, when the level of the audio mix approaches the playback limit thresholds of a particular loudspeaker, mapping of components into that loudspeaker is reduced in favor of increasing the mapping into other loudspeakers for which the mix level is further from the limit thresholds of the other loudspeakers. This way, the overall level of the rendered audio may not be constrained by the less-capable loudspeakers. However, the less-capable loudspeakers may still be used when audio signal levels are below their limit thresholds.

Constructing such a dynamic rendering system should be done with care in order to prevent the introduction of additional perceptual artifacts in the process of trying to maximize playback level. For example, consider an individual component of the spatial audio mix with an intended perceived location of "front-left." If a loudspeaker is physically located in close proximity to this intended perceived location, then ideally a large proportion of the component signal energy should be mapped to this loudspeaker. However, if the signal level of the mix approaches the playback limit of this loudspeaker, then we wish to map a larger proportion of this component signal into other more capable loudspeakers in order to reduce the activation of the first loudspeaker's dynamics processing, thereby better maintaining the overall playback level of the mix. As signal energy is dynamically diverted into these other loudspeakers that are possibly less well suited to achieving the intended perceived location of the component signal due to their less proximal physical locations relative to the intended perceived location, the possibility of perceiving this diversion as an unwanted spatial shift of the component signal should be minimized.

To achieve this minimization, some disclosed methods employ several strategies simultaneously:

1. Firstly, in some examples the mapping of each component signal into loudspeaker signals takes into account the current signal level of the audio mix and makes a "best effort" to achieve the desired perceived location of the component audio signal using the loudspeakers that are deemed available under the signal level conditions at that particular moment. In some examples, making this "best effort" may involve what will be described herein as approximately achieving the intended perceived spatial position of an audio signal component. The intended perceived spatial position may correspond with a channel of a channel-based audio format, with positional metadata of an audio object, or with both the channel and the positional metadata. According to some examples, approximately achieving the intended perceived spatial position of an audio signal component may involve minimizing a difference between a perceived spatial position and the intended perceived spatial position, for example given the available loudspeakers in an audio environment, the capabilities of each loudspeaker and the associated loudspeaker positions. In some examples, approximately achieving the intended perceived spatial position of an audio signal component may involve minimizing a cost function. In this way, such methods individually optimize the spatial mapping of each component signal with respect to signal level conditions. This differs from a simpler solution that might, for example, render to loudspeaker signals using the above-described method that optimizes spatial imaging but ignores signal level, and then subsequently redistributes energy of the already rendered signals between loudspeakers based on a comparison of the rendered signal levels to each loudspeaker's limit thresholds.
2. Secondly, in some examples the mapping from component signals to loudspeaker feeds as well as the characterization of signal level with respect to loudspeaker playback limits on which this mapping depends may both be computed in a time- and frequency-varying manner. In this way, the diversion of any component signal's energy away from its spatially optimal loudspeakers occurs only in frequency regions and at moments in time where signal energy is nearing the limit thresholds of these optimal loudspeakers. This approach minimizes the amount of diverted energy and allows more energy of any component signal to remain in the loudspeakers optimal for its spatial reproduction. The likelihood that the perceived location of the component signal remains at its desired spatial position therefore remains high.
3. Lastly, the characterization of signal level with respect to loudspeaker playback limits on which the mapping from component signals to loudspeaker signals depends is computed for each individual component signal based on one or more of the component signals of the mix and their intended perceived positions. In this way, the diversion of signal energy between loudspeakers may be individualized not only to each component signal's desired perceived position, as outlined in the first strategy above, but also to an estimate of overall signal level that is optimized in some manner with respect to that components signal's relationship with the other components of the mix. For example, overall signal level associated with any component signal may be computed based on the spatial zones of the zone-based methods referred to above. In this way, the diversion of component signals lying in similar spatial zones will be similar, thereby stabilizing the perceived left/right balance of the dynamic rendering. Moreover, component signals belonging substantially to different zones may be diverted differently if the overall levels associated with these zones is significantly different. For example, if signal level of the surround zone is low, then those audio signal components associated largely with the surround zone may have little diversion applied to their mapping. At that same time, signal level for the front zone might be high, and those components associated largely with the front zone may have more diversion applied to their mapping. This strategy may therefore also help minimize the amount of diverted energy across the entire spatial mix by applying diversion only to component signals belonging to spatial zones for which it is required.

FIG. 1 is a block diagram that shows examples of components of an apparatus capable of implementing various aspects of this disclosure. As with other figures provided herein, the types and numbers of elements shown in FIG. 1 are merely provided by way of example. Other implementations may include more, fewer and/or different types and numbers of elements. According to some examples, the apparatus 100 may be, or may include, a smart audio device that is configured for performing at least some of the methods disclosed herein. In other implementations, the apparatus 100 may be, or may include, another device that is configured for performing at least some of the methods disclosed herein, such as a laptop computer, a cellular telephone, a tablet device, a smart home hub, etc. In some such implementations the apparatus 100 may be, or may include, a server.

In this example, the apparatus 100 includes an interface system 105 and a control system 110. The interface system 105 may, in some implementations, be configured for receiving audio data. The audio data may include audio signals that are scheduled to be reproduced by at least some speakers of an environment. The audio data may include one or more audio signals and associated spatial data. The spatial data may, for example, include channel data and/or spatial metadata. The interface system 105 may be configured for providing rendered audio signals to at least some loudspeakers of the set of loudspeakers of the environment. The interface system 105 may, in some implementations, be configured for receiving input from one or more microphones in an environment.

The interface system 105 may include one or more network interfaces and/or one or more external device interfaces (such as one or more universal serial bus (USB) interfaces). According to some implementations, the interface system 105 may include one or more wireless interfaces. The interface system 105 may include one or more devices for implementing a user interface, such as one or more microphones, one or more speakers, a display system, a touch sensor system and/or a gesture sensor system. In some examples, the interface system 105 may include one or more interfaces between the control system 110 and a memory system, such as the optional memory system 115 shown in FIG. 1. However, the control system 110 may include a memory system in some instances.

The control system 110 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some implementations, the control system 110 may reside in more than one device. For example, a portion of the control system 110 may reside in a device within one of the environments depicted herein and another portion of the control system 110 may reside in a device that is outside the environment, such as a server, a mobile device (e.g., a smartphone or a tablet computer), etc. In other examples, a portion of the control system 110 may reside in a device within one of the environments depicted herein and another portion of the control system 110 may reside in one or more other devices of the environment. For example, control system functionality may be distributed across multiple smart audio devices of an environment, or may be shared by an orchestrating device (such as what may be referred to herein as a smart home hub) and one or more other devices of the environment. The interface system 105 also may, in some such examples, reside in more than one device.

In some implementations, the control system 110 may be configured for performing, at least in part, the methods disclosed herein. According to some examples, the control system 110 may be configured for implementing methods of managing playback of multiple streams of audio over multiple loudspeakers.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 115 shown in FIG. 1 and/or in the control system 110. Accordingly, various innovative aspects of the subject matter described in this disclosure can be implemented in one or more non-transitory media having software stored thereon. The software may, for example, include instructions for controlling at least one device to process audio data. The software may, for example, be executable by one or more components of a control system such as the control system 110 of FIG. 1.

In some examples, the apparatus 100 may include the optional microphone system 120 shown in FIG. 1. The optional microphone system 120 may include one or more microphones. In some implementations, one or more of the microphones may be part of, or associated with, another device, such as a speaker of the speaker system, a smart audio device, etc.

According to some implementations, the apparatus 100 may include the optional loudspeaker system 125 shown in FIG. 1. The optional loudspeaker system 125 may include one or more loudspeakers. Loudspeakers may sometimes be referred to herein as "speakers." In some examples, at least some loudspeakers of the optional loudspeaker system 125 may be arbitrarily located. For example, at least some speakers of the optional loudspeaker system 125 may be placed in locations that do not correspond to any standard prescribed speaker layout, such as Dolby 5.1, Dolby 5.1.2, Dolby 7.1, Dolby 7.1.4, Dolby 9.1, Hamasaki 22.2, etc. In some such examples, at least some loudspeakers of the optional loudspeaker system 125 may be placed in locations that are convenient to the space (e.g., in locations where there is space to accommodate the loudspeakers), but not in any standard prescribed loudspeaker layout.

In some implementations, the apparatus 100 may include the optional sensor system 130 shown in FIG. 1. The optional sensor system 130 may include one or more cameras, touch sensors, gesture sensors, motion detectors, etc. According to some implementations, the optional sensor system 130 may include one or more cameras. In some implementations, the cameras may be free-standing cameras. In some examples, one or more cameras of the optional sensor system 130 may reside in a smart audio device, which may be a single purpose audio device or a virtual assistant. In some such examples, one or more cameras of the optional sensor system 130 may reside in a TV, a mobile phone or a smart speaker.

In some implementations, the apparatus 100 may include the optional display system 135 shown in FIG. 1. The optional display system 135 may include one or more displays, such as one or more light-emitting diode (LED) displays. In some instances, the optional display system 135 may include one or more organic light-emitting diode (OLED) displays. In some examples wherein the apparatus 100 includes the display system 135, the sensor system 130 may include a touch sensor system and/or a gesture sensor system proximate one or more displays of the display system 135. According to some such implementations, the control system 110 may be configured for controlling the display system 135 to present a graphical user interface (GUI), such as one of the GUIs disclosed herein.

According to some examples the apparatus 100 may be, or may include, a smart audio device. In some such implementations the apparatus 100 may be, or may include, a wakeword detector. For example, the apparatus 100 may be, or may include, a virtual assistant.

Figure 2:
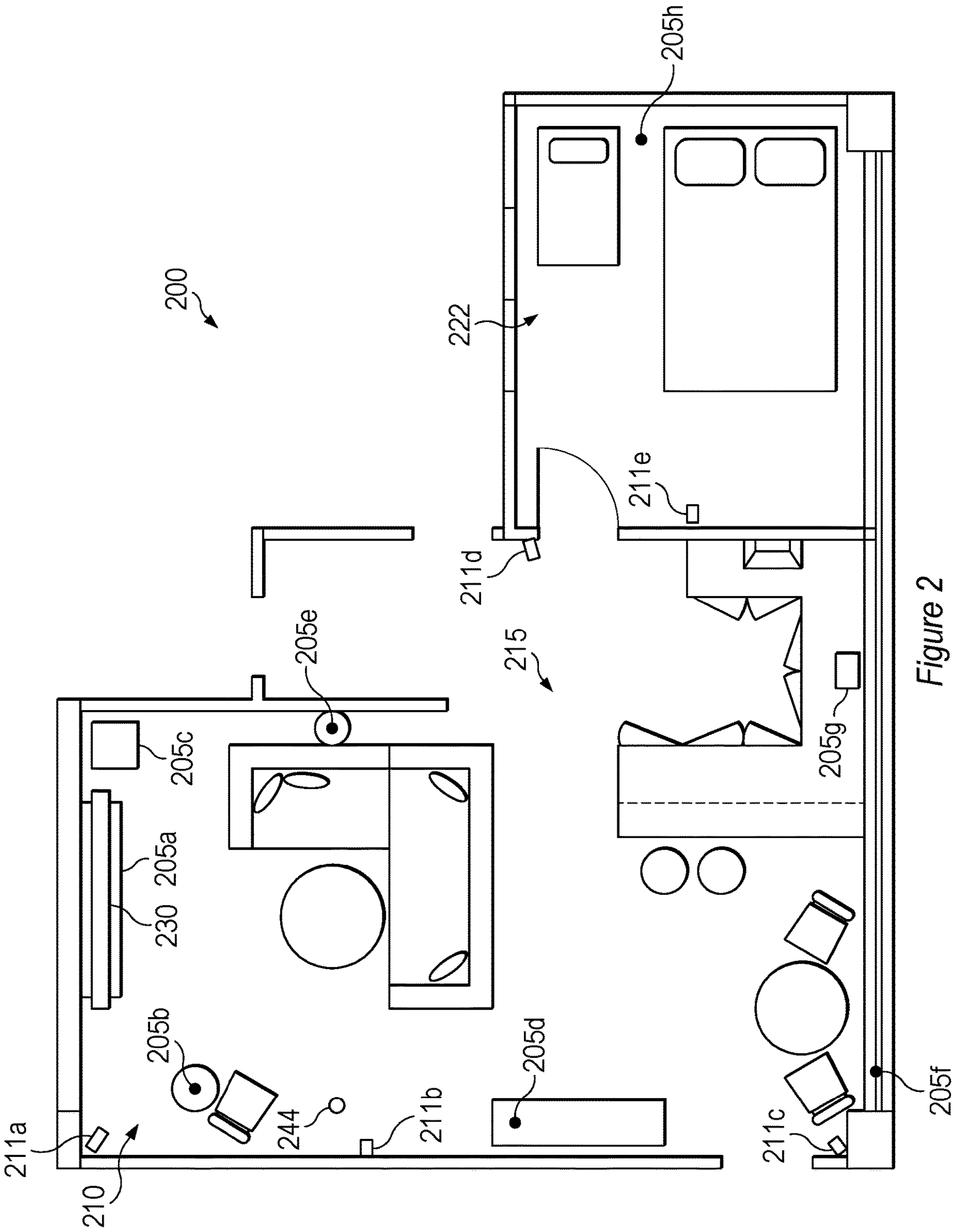
FIG. 2 depicts a floor plan of a listening environment, which is a living space in this example.

FIG. 2 depicts a floor plan of a listening environment, which is a living space in this example. As with other figures provided herein, the types and numbers of elements shown in FIG. 2 are merely provided by way of example. Other implementations may include more, fewer and/or different types and numbers of elements. According to this example, the environment 200 includes a living room 210 at the upper left, a kitchen 215 at the lower center, and a bedroom 222 at the lower right. Boxes and circles distributed across the living space represent a set of loudspeakers 205*a*-205*h*, at least some of which may be smart speakers in some implementations, placed in locations convenient to the space, but not adhering to any standard prescribed layout (arbitrarily placed). In some examples, the loudspeakers 205*a*-205*h* may be coordinated to implement one or more disclosed embodiments.

According to some examples, the environment 200 may include a smart home hub for implementing at least some of the disclosed methods. According to some such implementations, the smart home hub may include at least a portion of the above-described control system 110. In some examples, a smart device (such as a smart speaker, a mobile phone, a smart television, a device used to implement a virtual assistant, etc.) may implement the smart home hub.

In this example, the environment 200 includes cameras 211*a*-211*e*, which are distributed throughout the environment. In some implementations, one or more smart audio devices in the environment 200 also may include one or more cameras. The one or more smart audio devices may be single purpose audio devices or virtual assistants. In some such examples, one or more cameras of the optional sensor system 130 may reside in or on the television 230, in a mobile phone or in a smart speaker, such as one or more of the loudspeakers 205*b*, 205*d*, 205*e* or 205*h*. Although cameras 211*a*-211*e* are not shown in every depiction of the environment 200 presented in this disclosure, each of the environments 200 may nonetheless include one or more cameras in some implementations.

In flexible rendering, spatial audio may be rendered over an arbitrary number of arbitrarily placed speakers. With the widespread deployment of smart audio devices (e.g., smart speakers) in the home, there is need for realizing flexible rendering technology which allows consumers to perform flexible rendering of audio, and playback of the so-rendered audio, using smart audio devices.

Several technologies have been developed to implement flexible rendering, including: Center of Mass Amplitude Panning (CMAP), and Flexible Virtualization (FV).

In the context of performing rendering (or rendering and playback) of a spatial audio mix (e.g., rendering of a stream of audio or multiple streams of audio) for playback by the smart audio devices of a set of smart audio devices (or by another set of speakers), the types of speakers (e.g., in, or coupled to, smart audio devices) might be varied, and the corresponding acoustics capabilities of the speakers might therefore vary quite significantly. In the example shown in FIG. 2, the loudspeakers 205*d*, 205*f* and 205*h* are smart speakers with a single 0.6-inch speaker. In this example, loudspeakers 205*b*, 205*c*, 205*e* and 205*f* are smart speakers having a 2.5-inch woofer and a 0.8-inch tweeter. According to this example, the loudspeaker 205*g* is a smart speaker with a 5.25-inch woofer, three 2-inch midrange speakers and a 1.0-inch tweeter. Here, the loudspeaker 205*a* is a sound bar having sixteen 1.1-inch beam drivers and two 4-inch woofers. Accordingly, the low-frequency capability of smart speakers 205*d* and 205*f* is significantly less than that of the other loudspeakers in the environment 200, particular those having 4-inch or 5.25-inch woofers.

Examples of Dynamics Processing, Including Some Related Zone-Based Methods

Figure 3:
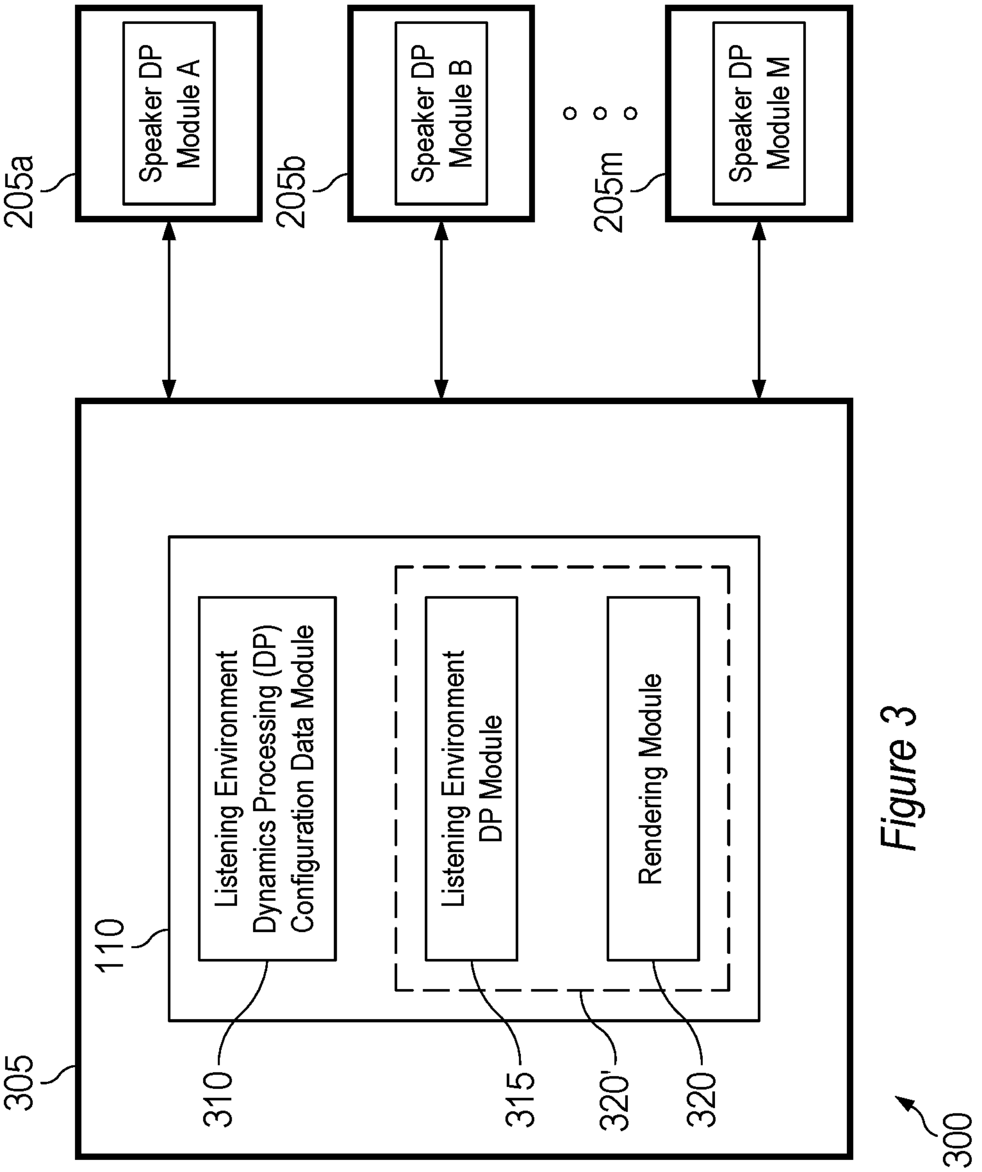
FIG. 3 is a block diagram that shows examples of components of a system capable of implementing various aspects of this disclosure.

FIG. 3 is a block diagram that shows examples of components of a system capable of implementing various aspects of this disclosure. As with other figures provided herein, the types and numbers of elements shown in FIG. 3 are merely provided by way of example. Other implementations may include more, fewer and/or different types and numbers of elements.

According to this example, the system 300 includes a smart home hub 305 and loudspeakers 205*a* through 205*m*. In this example, the smart home hub 305 includes an instance of the control system 110 that is shown in FIG. 1 and described above. According to this implementation, the control system 110 includes a listening environment dynamics processing configuration data module 310, a listening environment dynamics processing module 315 and a rendering module 320. Some examples of the listening environment dynamics processing configuration data module 310, the listening environment dynamics processing module 315 and the rendering module 320 are described below. In some examples, a rendering module 320' may be configured for both rendering and listening environment dynamics processing.

As suggested by the arrows between the smart home hub 305 and the loudspeakers 205*a* through 205*m*, the smart home hub 305 also includes an instance of the interface system 105 that is shown in FIG. 1 and described above. According to some examples, the smart home hub 305 may be part of the environment 200 shown in FIG. 2. In some instances, the smart home hub 305 may be implemented by a smart speaker, a smart television, a cellular telephone, a laptop, etc. In some implementations, the smart home hub 305 may be implemented by software, e.g., via software of a downloadable software application or "app." In some instances, the smart home hub 305 may be implemented in each of the loudspeakers 205*a-m*, all operating in parallel to generate the same processed audio signals from module 320. According to some such examples, in each of the loudspeakers the rendering module 320 may then generate one or more speaker feeds relevant to each loudspeaker, or group of loudspeakers, and may provide these speaker feeds to each speaker dynamics processing module.

In some instances, the loudspeakers 205*a* through 205*m* may include the loudspeakers 205*a* through 205*h* of FIG. 2, whereas in other examples the loudspeakers 205*a* through 205*m* may be, or may include other loudspeakers. Accordingly, in this example the system 300 includes M loudspeakers, where M is an integer greater than 2.

Smart speakers, as well as many other powered speakers, typically employ some type of internal dynamics processing to prevent the speakers from distorting. Often associated with such dynamics processing are signal limit thresholds (e.g., limit thresholds, which are variable across frequency), below which the signal level is dynamically held. For example, Dolby's Audio Regulator, one of several algorithms in the Dolby Audio Processing (DAP) audio post-processing suite, provides such processing. In some instances—but not typically via a smart speaker's dynamics processing module—dynamics processing also may involve applying one or more compressors, gates, expanders, duckers, etc.

Accordingly, in this example each of the loudspeakers 205*a* through 205*m* includes a corresponding speaker dynamics processing (DP) module A through M. The speaker dynamics processing modules are configured to apply individual loudspeaker dynamics processing configuration data for each individual loudspeaker of a listening environment. The speaker DP module A, for example, is configured to apply individual loudspeaker dynamics processing configuration data that is appropriate for the loudspeaker 205*a*. In some examples, the individual loudspeaker dynamics processing configuration data may correspond with one of more capabilities of the individual loudspeaker, such as the loudspeaker's ability to reproduce audio data within a particular frequency range and at a particular level without appreciable distortion.

When spatial audio is rendered across a set of heterogeneous speakers (e.g., speakers of, or coupled to, smart audio devices), each with potentially different playback limits, care should be taken in performing dynamics processing on the overall audio mix. A simple solution is to render the spatial mix to speaker feeds for each of the participating speakers and then allow the dynamics processing module associated with each speaker to operate independently on its corresponding speaker feed, according to the limits of that speaker.

While this approach will keep each speaker from distorting, it may dynamically shift the spatial balance of the mix in a perceptually distracting manner. For example, referring to FIG. 2, suppose that a television program is being shown on the television 230 and that corresponding audio is being reproduced by the loudspeakers of the environment 200. Suppose that during the television program, audio associated with a stationary object (such as a unit of heavy machinery in a factory) is intended to be rendered to the position 244. Suppose further that a dynamics processing module associated with the loudspeaker 205*d* reduces the level for audio in the bass range substantially more than a dynamics processing module associated with the loudspeaker 205*b* does, because of the substantially greater capability of the loudspeaker 205*b* to reproduce sounds in the bass range. If the volume of a signal associated with the stationary object fluctuates, when the volume is higher the dynamics processing module associated with the loudspeaker 205*d* will cause the level for audio in the bass range to be reduced substantially more than the level for the same audio will be reduced by the dynamics processing module associated with the loudspeaker 205*b*. This difference in level will cause the apparent location of the stationary object to change. An improved solution is therefore needed.

Some embodiments of the present disclosure are systems and methods for rendering (or rendering and playback) of a spatial audio mix (e.g., rendering of a stream of audio or multiple streams of audio) for playback by at least one (e.g., all or some) of the smart audio devices of a set of smart audio devices (e.g., a set of coordinated smart audio devices), and/or by at least one (e.g., all or some) of the speakers of another set of speakers. Some embodiments are methods (or systems) for such rendering (e.g., including generation of speaker feeds), and also playback of the rendered audio (e.g., playback of generated speaker feeds). Examples of such embodiments include the following:

Systems and methods for audio processing may include rendering audio (e.g., rendering a spatial audio mix, for example by rendering a stream of audio or multiple streams of audio) for playback by at least two speakers (e.g., all or some of the speakers of a set of speakers), including by:

(a) combining individual loudspeaker dynamics processing configuration data (such as limit thresholds (playback limit thresholds) of the individual loudspeakers, thereby determining listening environment dynamics processing configuration data for the plurality of loudspeakers (such as combined thresholds);

(b) performing dynamics processing on the audio (e.g., the stream(s) of audio indicative of a spatial audio mix) using the listening environment dynamics processing configuration data for the plurality of loudspeakers (e.g., the combined thresholds) to generate processed audio; and (c) rendering the processed audio to speaker feeds.

According to some implementations, process (a) may be performed by a module such as the listening environment dynamics processing configuration data module 310 shown in FIG. 3. The smart home hub 305 may be configured for obtaining, via an interface system, individual loudspeaker dynamics processing configuration data for each of the M loudspeakers. In this implementation, the individual loudspeaker dynamics processing configuration data include an individual loudspeaker dynamics processing configuration data set for each loudspeaker of the plurality of loudspeakers. According to some examples, the individual loudspeaker dynamics processing configuration data for one or more loudspeakers may correspond with one or more capabilities of the one or more loudspeakers. In this example, each of the individual loudspeaker dynamics processing configuration data sets includes at least one type of dynamics processing configuration data. In some examples, the smart home hub 305 may be configured for obtaining the individual loudspeaker dynamics processing configuration data sets by querying each of the loudspeakers 205*a*-205*m*. In other implementations, the smart home hub 305 may be configured for obtaining the individual loudspeaker dynamics processing configuration data sets by querying a data structure of previously-obtained individual loudspeaker dynamics processing configuration data sets that are stored in a memory.

In some examples, process (b) may be performed by a module such as the listening environment dynamics processing module 315 of FIG. 3. Some detailed examples of processes (a) and (b) are described below.

In some examples, the rendering of process (c) may be performed by a module such as the rendering module 320 or the rendering module 320' of FIG. 3. In some embodiments, the audio processing may involve:

(d) performing dynamics processing on the rendered audio signals according to the individual loudspeaker dynamics processing configuration data for each loudspeaker (e.g., limiting the speaker feeds according to the playback limit thresholds associated with the corresponding speakers, thereby generating limited speaker feeds). Process (d) may, for example, be performed by the dynamics processing modules A through M shown in FIG. 3.

The speakers may include speakers of (or coupled to) at least one (e.g., all or some) of the smart audio devices of a set of smart audio devices. In some implementations, to generate the limited speaker feeds in step (d), the speaker feeds generated in step (c) may be processed by a second stage of dynamics processing (e.g., by each speaker's associated dynamics processing system), e.g., to generate the speaker feeds prior to their final playback over the speakers. For example, the speaker feeds (or a subset or portion thereof) may be provided to a dynamics processing system of each different one of the speakers (e.g., a dynamics processing subsystem of a smart audio device, where the smart audio device includes or is coupled to the relevant one of the speakers), and the processed audio output from each said dynamics processing system may be used to generate a speaker feed for the relevant one of the speakers. Following the speaker-specific dynamics processing (in other words, the independently performed dynamics processing for each of the speakers), the processed (e.g., dynamically limited) speaker feeds may be used to drive the speakers to cause playback of sound.

The first stage of dynamics processing (in step (b)) may be designed to reduce a perceptually distracting shift in spatial balance which would otherwise result if steps (a) and (b) were omitted, and the dynamics processed (e.g., limited) speaker feeds resulting from step (d) may be generated in response to the original audio (rather than in response to the processed audio generated in step (b)). This may prevent an undesirable shift in the spatial balance of a mix. The second stage of dynamics processing operating on rendered speaker feeds from step (c) may be designed to ensure that no speaker distorts, because the dynamics processing of step (b) may not necessarily guarantee that signal levels have been reduced below the thresholds of all speakers. The combining of individual loudspeaker dynamics processing configuration data (e.g., the combination of thresholds in the first stage (step (a)) may, in some examples, involve a step of averaging the individual loudspeaker dynamics processing configuration data (e.g., the limit thresholds) across the speakers (e.g., across smart audio devices), or taking the minimum of the individual loudspeaker dynamics processing configuration data (e.g., the limit thresholds) across the speakers (e.g., across smart audio devices).

In some implementations, when the first stage of dynamics processing (in step (b)) operates on audio indicative of a spatial mix (e.g., audio of an object-based audio program, including at least one object channel and optionally also at least one speaker channel), this first stage may be implemented according to a technique for audio object processing through use of spatial zones. In such a case, the combined individual loudspeaker dynamics processing configuration data (e.g., combined limit thresholds) associated with each of the zones may be derived by (or as) a weighted average of individual loudspeaker dynamics processing configuration data (e.g., individual speaker limit thresholds), and this weighting may be given or determined, at least in part, by each speaker's spatial proximity to and/or position within, the zone.

In an example embodiment we assume a plurality of M speakers ($M \geq 2$), where each speaker is indexed by the variable i. Associated with each speaker i is a set of frequency varying playback limit thresholds $T_i[f]$, where the variable f represents an index into a finite set of frequencies at which the thresholds are specified. (Note that if the size of the set of frequencies is one then the corresponding single threshold may be considered broadband, applied across the entire frequency range). According to this example, these thresholds are utilized by each speaker in its own independent dynamics processing function to limit the audio signal below the thresholds $T_i[f]$ for a particular purpose, such as preventing the speaker from distorting or preventing the speaker from playing beyond some level deemed objectionable in its vicinity.

Figure 4A:
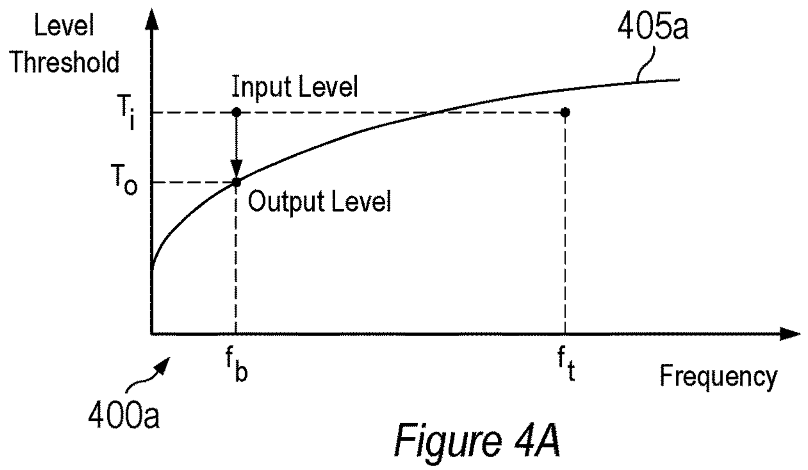
FIGS. 4A, 4B and 4C show examples of playback limit thresholds and corresponding frequencies.
Figure 4B:
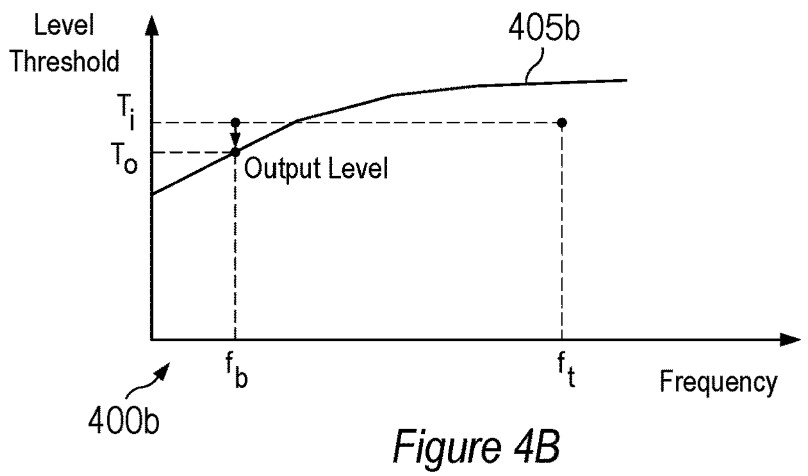
Figure 4C:
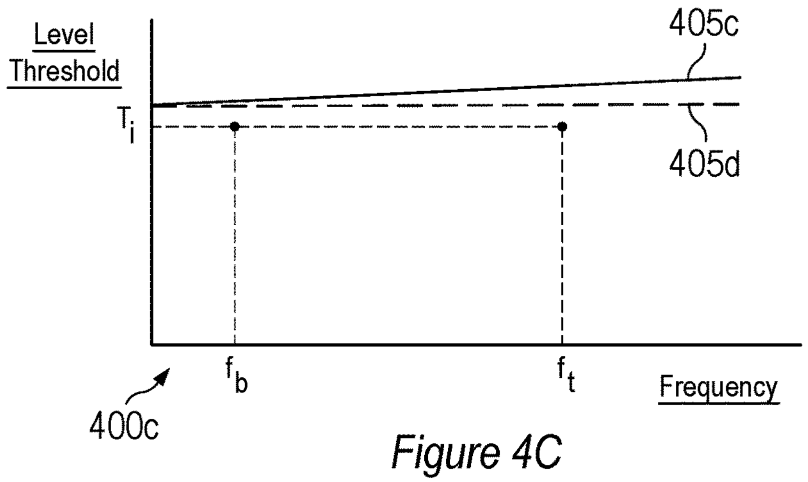

FIGS. 4A, 4B and 4C show examples of playback limit thresholds and corresponding frequencies. The range of frequencies shown may, for example, span the range of frequencies that are audible to the average human being (e.g., 20 Hz to 20 kHz). In these examples, the playback limit thresholds are indicated by the vertical axes of the graphs 400*a*, 400*b* and 400*c*, which are labeled "Level Threshold" in these examples. The playback limit/level thresholds increase in the direction of the arrows on the vertical axes. The playback limit/level thresholds may, for example, be expressed in decibels. In these examples, the horizontal axes of the graphs 400*a*, 400*b* and 400*c* indicate frequencies, which increase in the direction of the arrows on the horizontal axes. The playback limit thresholds indicated by the curves 400*a*, 400*b* and 400*c* may, for example, be implemented by dynamics processing modules of individual loudspeakers.

The graph 400*a* of FIG. 4A shows a first example of playback limit threshold as a function of frequency. The curve 405*a* indicates the playback limit threshold for each corresponding frequency value. In this example, at a bass frequency $f_b$, input audio that is received at an input level $T_i$ will be output by a dynamics processing module at an output level $T_o$. The bass frequency $f_b$ may, for example, be in the range of 60 to 250 Hz. However, in this example, at a treble frequency $f_t$, input audio that is received at an input level $T_i$ will be output by a dynamics processing module at the same level, input level $T_i$. The treble frequency $f_t$ may, for example, be in the range above 1280 Hz. Accordingly, in this example the curve 405*a* corresponds to a dynamics processing module that applies a significantly lower threshold for bass frequencies than for treble frequencies. Such a dynamics processing module may be appropriate for a loudspeaker that has no woofer (e.g., the loudspeaker 205*d* of FIG. 2).

The graph 400*b* of FIG. 4B shows a second example of playback limit threshold as a function of frequency. The curve 405*b* indicates that at the same bass frequency $f_b$ shown in FIG. 4A, input audio that is received at an input level $T_i$ will be output by a dynamics processing module at a higher output level $T_o$. Accordingly, in this example the curve 405*b* corresponds to a dynamics processing module that does not apply as low a threshold for bass frequencies than the curve 405*a*. Such a dynamics processing module may be appropriate for a loudspeaker that has at least a small woofer (e.g., the loudspeaker 205*b* of FIG. 2).

The graph 400*c* of FIG. 4C shows a third example of playback limit threshold as a function of frequency. The curve 405*c* (which is a straight line in this example) indicates that at the same bass frequency $f_b$ shown in FIG. 4A, input audio that is received at an input level $T_i$ will be output by a dynamics processing module at the same level. Accordingly, in this example the curve 405*c* corresponds to a dynamics processing module that may be appropriate for a loudspeaker that is capable of reproducing a wide range of frequencies, including bass frequencies. One will observe that, for the sake of simplicity, a dynamics processing module could approximate the curve 405*c* by implementing the curve 405*d*, which applies the same threshold for all frequencies indicated.

A spatial audio mix may be rendered for the plurality of speakers using a known rendering system such as Center of Mass Amplitude Panning (CMAP) or Flexible Virtualization (FV). From the constituent components of a spatial audio mix, the rendering system generates speaker feeds, one for each of the plurality of speakers. In some previous examples, the speaker feeds were then processed independently by each speaker's associated dynamics processing function with thresholds $T_i$ [f]. Without the benefits of the present disclosure, this described rendering scenario may result in distracting shifts in the perceived spatial balance of the rendered spatial audio mix. For example, one of the M speakers, say on the right-hand side of the listening area, may be much less capable than the others (e.g., of rendering audio in the bass range) and therefore the thresholds $T_i$ [f] for that speaker may be significantly lower than those of the other speakers, at least in a particular frequency range. During playback, this speaker's dynamics processing module will be lowering the level of components of the spatial mix on the right-hand side significantly more than components on the left-hand side. Listeners are extremely sensitive to such dynamic shifts between the left/right balance of a spatial mix and may find the results very distracting.

To deal with this issue, in some examples the individual loudspeaker dynamics processing configuration data (e.g., the playback limit thresholds) of the individual speakers of a listening environment are combined to create listening environment dynamics processing configuration data for all loudspeakers of the listening environment. The listening environment dynamics processing configuration data may then be utilized to first perform dynamics processing in the context of the entire spatial audio mix prior to its rendering to speaker feeds. Because this first stage of dynamics processing has access to the entire spatial mix, as opposed to just one independent speaker feed, the processing may be performed in ways that do not impart distracting shifts to the perceived spatial balance of the mix. The individual loudspeaker dynamics processing configuration data (e.g., the playback limit thresholds) may be combined in a manner that eliminates or reduces the amount of dynamics processing that is performed by any of the individual speaker's independent dynamics processing functions.

In one example of determining the listening environment dynamics processing configuration data, the individual loudspeaker dynamics processing configuration data (e.g., the playback limit thresholds) for the individual speakers may be combined into a single set of listening environment dynamics processing configuration data (e.g., frequency-varying playback limit thresholds $\overline{T}$[f]) that are applied to all components of the spatial mix in the first stage of dynamics processing. According to some such examples, because the limiting is the same on all components, the spatial balance of the mix may be maintained. One way to combine the individual loudspeaker dynamics processing configuration data (e.g., the playback limit thresholds) is to take minimum across all speakers i:

$$\overline{T}[f]=\min_i(T_i[f]) \quad \text{Equation (A)}$$

Such a combination essentially eliminates the operation of each speaker's individual dynamics processing because the spatial mix is first limited below the threshold of the least capable speaker at every frequency. However, such a strategy may be overly aggressive. Many speakers may be playing back at a level lower than they are capable, and the combined playback level of all the speakers may be objectionably low. For example, if the thresholds in the bass range shown in FIG. 4A were applied to the loudspeaker corresponding to the thresholds for FIG. 4C, the playback level of the latter speaker would be unnecessarily low in the bass range. An alternative combination of determining the listening environment dynamics processing configuration data is to take the mean (average) of individual loudspeaker dynamics processing configuration data across all speakers of the listening environment. For example, in the context of playback limit thresholds, the mean may be determined as follows:

$$\overline{T}[f]=\text{mean}_i(T_i[f]) \quad \text{Equation (B)}$$

For this combination, overall playback level may increase in comparison to taking the minimum because the first stage of dynamics processing limits to a higher level, thereby allowing the more capable speakers to play back more loudly. For speakers whose individual limit thresholds fall below the mean, their independent dynamics processing functions may still limit their associated speaker feed if necessary. However, the first stage of dynamics processing will likely have reduced the requirements of this limiting since some initial limiting has been performed on the spatial mix.

According to some examples of determining the listening environment dynamics processing configuration data, one may create a tunable combination that interpolates between the minimum and the mean of the individual loudspeaker dynamics processing configuration data through a tuning parameter a. For example, in the context of playback limit thresholds, the interpolation may be determined as follows:

$$\overline{T}[f]=\alpha\,\text{mean}_i(T_i[f])+(1-\alpha)\min_i(T_i[f]) \quad \text{Equation (C)}$$

Other combinations of individual loudspeaker dynamics processing configuration data are possible, and the present disclosure is meant to cover all such combinations.

Figure 5A:
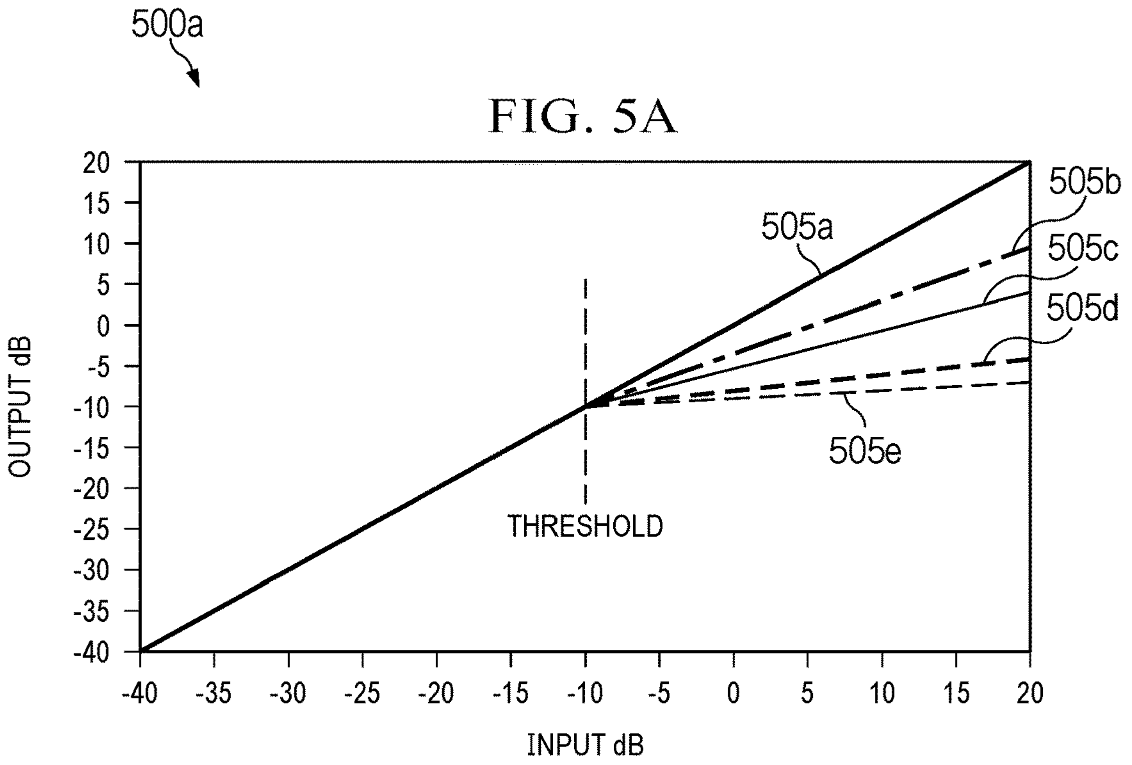
FIGS. 5A and 5B are graphs that show examples of dynamic range compression data.
Figure 5B:
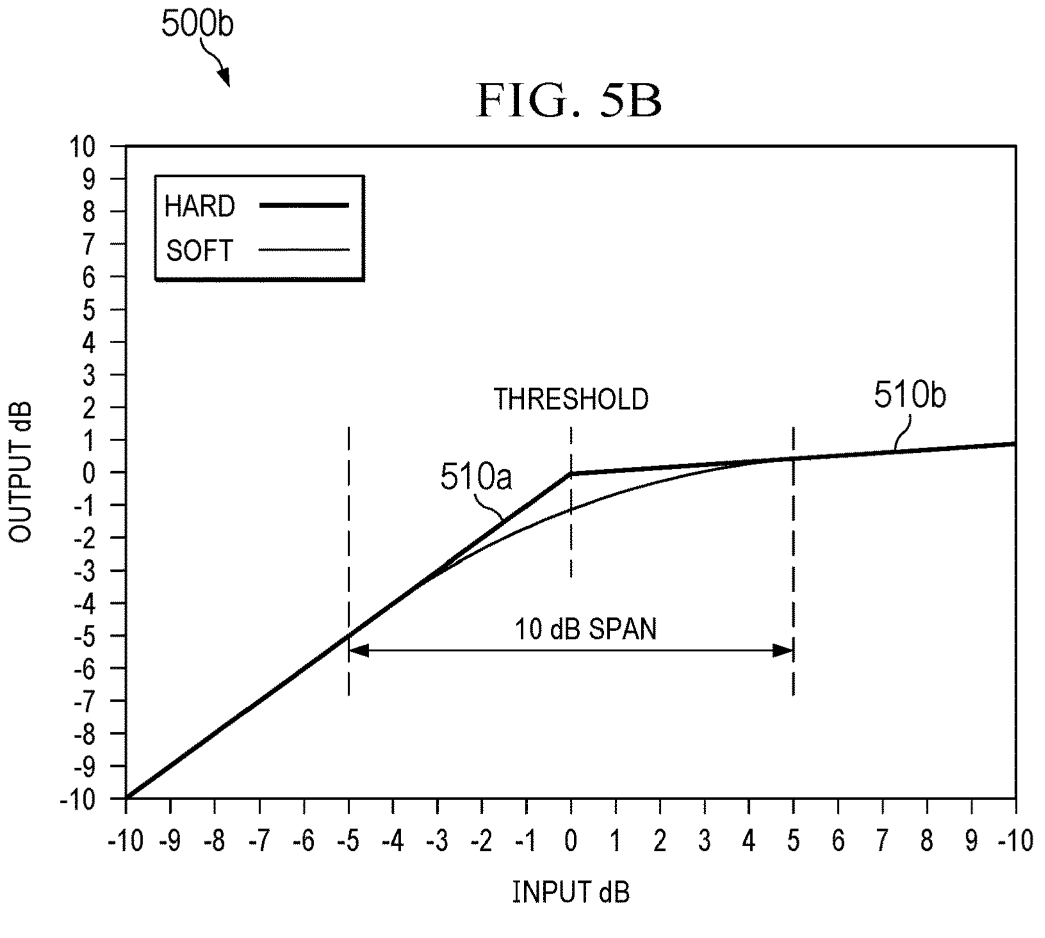

FIGS. 5A and 5B are graphs that show examples of dynamic range compression data. In graphs 500*a* and 500*b*, the input signal levels, in decibels, are shown on the horizontal axes and the output signal levels, in decibels, are shown on the vertical axes. As with other disclosed examples, the particular thresholds, ratios and other values are merely shown by way of example and are not limiting.

In the example shown in FIG. 5A, the output signal level is equal to the input signal level below the threshold, which is −10 dB in this example. Other examples may involve different thresholds, e.g., −20 dB, −18 dB, −16 dB, −14 dB, −12 dB, −8 dB, −6 dB, −4 dB, −2 dB, 0 dB, 2 dB, 4 dB, 6 dB, etc. Above the threshold, various examples of compression ratios are shown. An N:1 ratio means that above the threshold, the output signal level will increase by 1 dB for every N dB increase in the input signal. For example, a 10:1 compression ratio (line 505*e*) means that above the threshold, the output signal level will increase by only 1 dB for every 10 dB increase in the input signal. A 1:1 compression ratio (line 505*a*) means that the output signal level is still equal to the input signal level, even above the threshold. Lines 505*b*, 505*c*, and 505*d* correspond to 3:2, 2:1 and 5:1 compression ratios. Other implementations may provide different compression ratios, such as 2.5:1, 3:1, 3.5:1, 4:3, 4:1, etc.

FIG. 5B shows examples of "knees," which control how the compression ratio changes at or near the threshold, which is 0 dB in this example. According to this example, the compression curve having a "hard" knee is composed of two straight line segments, line segment 510*a* up to the threshold and line segment 510*b* above the threshold. A hard knee can be simpler to implement, but may cause artifacts.

In FIG. 5B, one example of a "soft" knee is also shown. In this example, the soft knee spans 10 dB. According to this implementation, above and below the 10 dB span, the compression ratios of the compression curve having the soft knee are the same as those of the compression curve having the hard knee. Other implementations may provide various other shapes of "soft" knees, which may span more or fewer decibels, may indicate a different compression ratio above the span, etc.

Other types of dynamic range compression data may include "attack" data and "release" data. The attack is a period during which the compressor is decreasing gain, e.g., in response to increased level at the input, to reach the gain determined by the compression ratio. Attack times for compressors generally range between 25 milliseconds and 500 milliseconds, though other attack times are feasible. The release is a period during which the compressor is increasing gain, e.g., in response to reduced level at the input, to reach the output gain determined by the compression ratio (or to the input level if the input level has fallen below the threshold). A release time may, for example, be in the range of 25 milliseconds to 2 seconds.

Accordingly, in some examples the individual loudspeaker dynamics processing configuration data may include, for each loudspeaker of the plurality of loudspeakers, a dynamic range compression data set. The dynamic range compression data set may include threshold data, input/output ratio data, attack data, release data and/or knee data. One or more of these types of individual loudspeaker dynamics processing configuration data may be combined to determine the listening environment dynamics processing configuration data. As noted above with reference to combining playback limit thresholds, the dynamic range compression data may be averaged to determine the listening environment dynamics processing configuration data in some examples. In some instances, a minimum or maximum value of the dynamic range compression data may be used to determine the listening environment dynamics processing configuration data (e.g., the maximum compression ratio). In other implementations, one may create a tunable combination that interpolates between the minimum and the mean of the dynamic range compression data for individual loudspeaker dynamics processing, e.g., via a tuning parameter such as described above with reference to Equation (C).

In some examples described above, a single set of listening environment dynamics processing configuration data (e.g., a single set of combined thresholds $\overline{T}[f]$) is applied to all components of the spatial mix in the first stage of dynamics processing. Such implementations can maintain the spatial balance of the mix, but may impart other unwanted artifacts. For example, "spatial ducking" may occur when a very loud part of the spatial mix in an isolated spatial region causes the entire mix to be turned down. Other softer components of the mix spatially distant form this loud component may be perceived to become unnaturally soft. For example, soft background music may be playing in the surround field of the spatial mix at a level lower than the combined thresholds $\overline{T}[f]$, and therefore no limiting of the spatial mix is performed by the first stage of dynamics processing. A loud gunshot might then be momentarily introduced at the front of the spatial mix (e.g. on screen for a movie sound track), and the overall level of the mix increases above the combined thresholds. At this moment, the first stage of dynamics processing lowers the level of the entire mix below the thresholds $\overline{T}[f]$. Because the music is spatially separate from the gunshot, this may be perceived as an unnatural ducking in the continuous stream of music.

Examples of Some Zone-Based Methods

To deal with such issues, some implementations allow independent or partially independent dynamics processing on different "spatial zones" of the spatial mix. A spatial zone may be considered a subset of the spatial region over which the entire spatial mix is rendered. Although much of the following discussion provides examples of dynamics processing based on playback limit thresholds, the concepts apply equally to other types of individual loudspeaker dynamics processing configuration data and listening environment dynamics processing configuration data.

Figure 6:
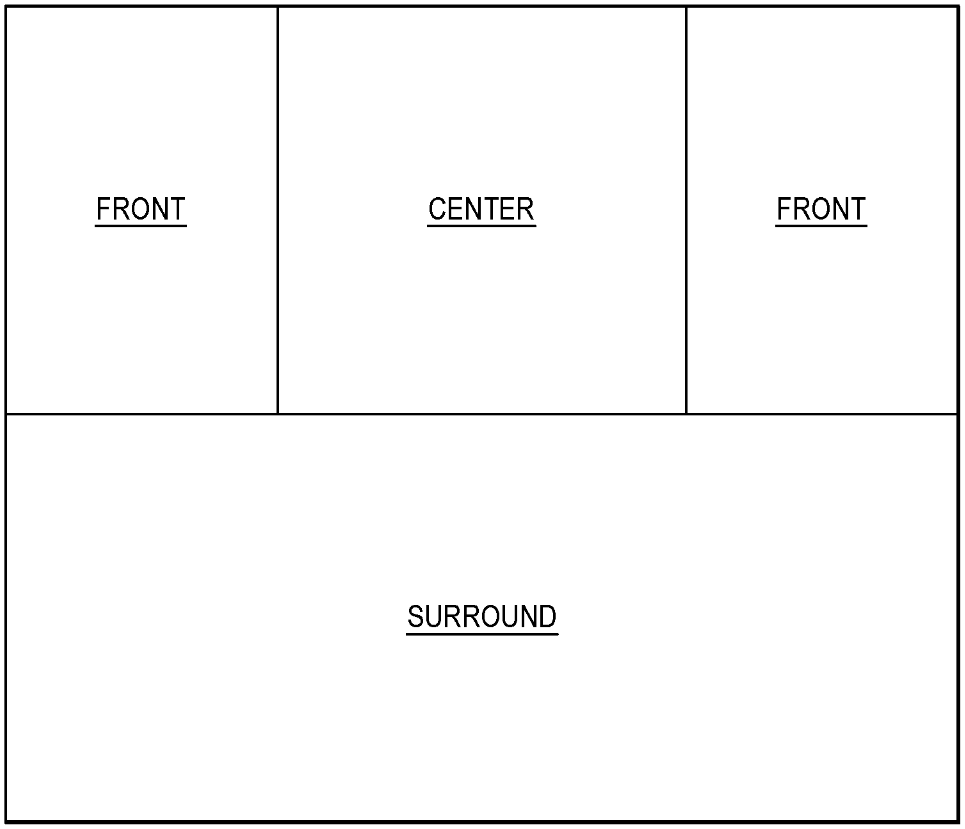
FIG. 6 shows an example of spatial zones of a listening environment.

FIG. 6 shows an example of spatial zones of a listening environment. FIG. 6 depicts an example of the region of the spatial mix (represented by the entire square), subdivided into three spatial zones: Front, Center, and Surround. Other examples may include more spatial zones, fewer spatial zones, different spatial zones, or combinations thereof. For instance, some examples may include one or more overhead zones.

While the spatial zones in FIG. 6 are depicted with hard boundaries, in practice it is beneficial to treat the transition from one spatial zone to another as continuous. For example, a component of a spatial mix located at the middle of the left edge of the square may have half of its level assigned to the front zone and half to the surround zone. Signal level from each component of the spatial mix may be assigned and accumulated into each of the spatial zones in this continuous manner. A dynamics processing function may then operate independently for each spatial zone on the overall signal level assigned to it from the mix. For each component of the spatial mix, the results of the dynamics processing from each spatial zone (e.g. time-varying gains per frequency) may then be combined and applied to the component. In some examples, this combination of spatial zone results is different for each component and is a function of that particular component's assignment to each zone. The end result is that components of the spatial mix with similar spatial zone assignments receive similar dynamics processing, but independence between spatial zones is allowed. The spatial zones may advantageously be chosen to prevent objectionable spatial shifts, such as left/right imbalance, while still allowing some spatially independent processing (e.g., to reduce other artifacts such as the described spatial ducking).

Techniques for processing a spatial mix by spatial zones may be advantageously employed in the first stage, or stages, of dynamics processing referenced above (such as stage (a), stage (b), or both. For example, a different combination of individual loudspeaker dynamics processing configuration data (e.g., playback limit thresholds) across the speakers i may be computed for each spatial zone. The set of combined zone thresholds may be represented by $\overline{T}_j[f]$, where the index j refers to one of a plurality of spatial zones. A dynamics processing module may operate independently on each spatial zone with its associated thresholds $\overline{T}_j[f]$ and the results may be applied back onto the constituent components of the spatial mix according to the technique described above.

Consider the spatial signal being rendered as composed of a total of K individual constituent signals $x_k[t]$, each with an associated desired spatial position (possibly time-varying). One particular method for implementing the zone processing involves computing time-varying panning gains $\alpha_{kj}[t]$ describing how much each audio signal $x_k[t]$ contributes to zone j as a function the audio signal's desired spatial position in relation to the position of the zone. These panning gains may advantageously be designed to follow a power preserving panning law requiring that the sum of the squares of the gains equal unity. From these panning gains, zone signals $s_j[t]$ may be computed as the sum of the constituent signals weighted by their panning gain for that zone:

$$s_j[t] = \sum_{k=1}^{K} \alpha_{kj}[t]x_k[t] \quad \text{Equation (D)}$$

Each zone signal $s_j[t]$ may then be processed independently by a dynamics processing function DP parametrized by the zone thresholds $\overline{T}_j[f]$ to produce frequency and time varying zone modification gains $G_j$:

$$G_j[f,t]=DP\{s_j[t],\overline{T}_j[f]\} \quad \text{Equation (E)}$$

Frequency and time varying modification gains may then be computed for each individual constituent signal $x_k[t]$ by combining the zone modification gains in proportion to that signal's panning gains for the zones:

$$G_k[f, t] = \sqrt{\sum_{j=1}^{J} (\alpha_{kj}G_j[f, t])^2} \quad \text{Equation (F)}$$

These signal modification gains $G_k$ may then be applied to each constituent signal, by use of a filterbank for example, to produce dynamics processed constituent signals $\hat{x}_k[t]$ which may then be subsequently rendered to speaker signals.

The combination of individual loudspeaker dynamics processing configuration data (such as speaker playback limit thresholds) for each spatial zone may be performed in a variety of manners. As one example, the spatial zone playback limit thresholds $\overline{T}_j[f]$ may be computed as a weighted sum of the speaker playback limit thresholds $T_i[f]$ using a spatial zone and speaker dependent weighting $w_{ij}[f]$:

$$\overline{T}_j[f]=\Sigma_i w_{ij}[f]T_i[f] \quad \text{Equation (G)}$$

Similar weighting functions may apply to other types of individual loudspeaker dynamics processing configuration data. Advantageously, the combined individual loudspeaker dynamics processing configuration data (e.g., playback limit thresholds) of a spatial zone may be biased towards the individual loudspeaker dynamics processing configuration data (e.g., the playback limit thresholds) of the speakers most responsible for playing back components of the spatial mix associated with that spatial zone. This may be achieved by setting the weights $w_{ij}[f]$ as a function of each speaker's responsibility for rendering components of the spatial mix associated with that zone for the frequency f.

Figure 7:
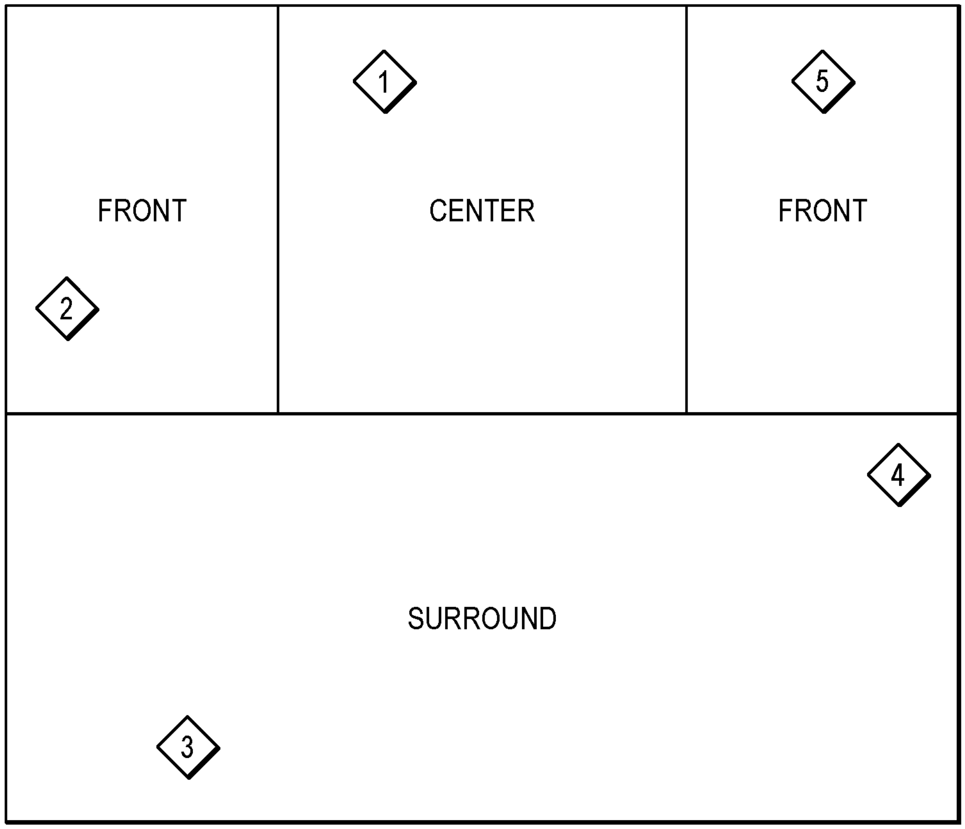
FIG. 7 shows examples of loudspeakers within the spatial zones of FIG. 6.

FIG. 7 shows examples of loudspeakers within the spatial zones of FIG. 6. FIG. 7 depicts the same zones from FIG. 6, but with the locations of five example loudspeakers (speakers 1, 2, 3, 4, and 5) responsible for rendering the spatial mix overlaid. In this example, the loudspeakers 1, 2, 3, 4, and 5 are represented by diamond shapes. In this particular example, speaker 1 is largely responsible for rendering the center zone, speakers 2 and 5 for the front zone, and speakers 3 and 4 for the surround zone. One could create weights $w_{ij}[f]$ based on this notional one-to-one mapping of speakers to spatial zones, but as with the spatial zone based processing of the spatial mix, a more continuous mapping may be preferred. For example, speaker 4 is quite close to the front zone, and a component of the audio mix located between speakers 4 and 5 (though in the notional front zone) will likely be played back largely by a combination of speakers 4 and 5. As such, it makes sense for the individual loudspeaker dynamics processing configuration data (e.g., playback limit thresholds) of speaker 4 to contribute to the combined individual loudspeaker dynamics processing configuration data (e.g., playback limit thresholds) of the front zone as well as the surround zone.

One way to achieve this continuous mapping is to set the weights $w_{ij}[f]$ equal to a speaker participation value describing the relative contribution of each speaker i in rendering components associated with spatial zone j. Such values may be derived directly from the rendering system responsible for rendering to the speakers (e.g., from step (c) described above) and a set of one or more nominal spatial positions associated with each spatial zone. This set of nominal spatial positions may include a set of positions within each spatial zone.

Figure 8:
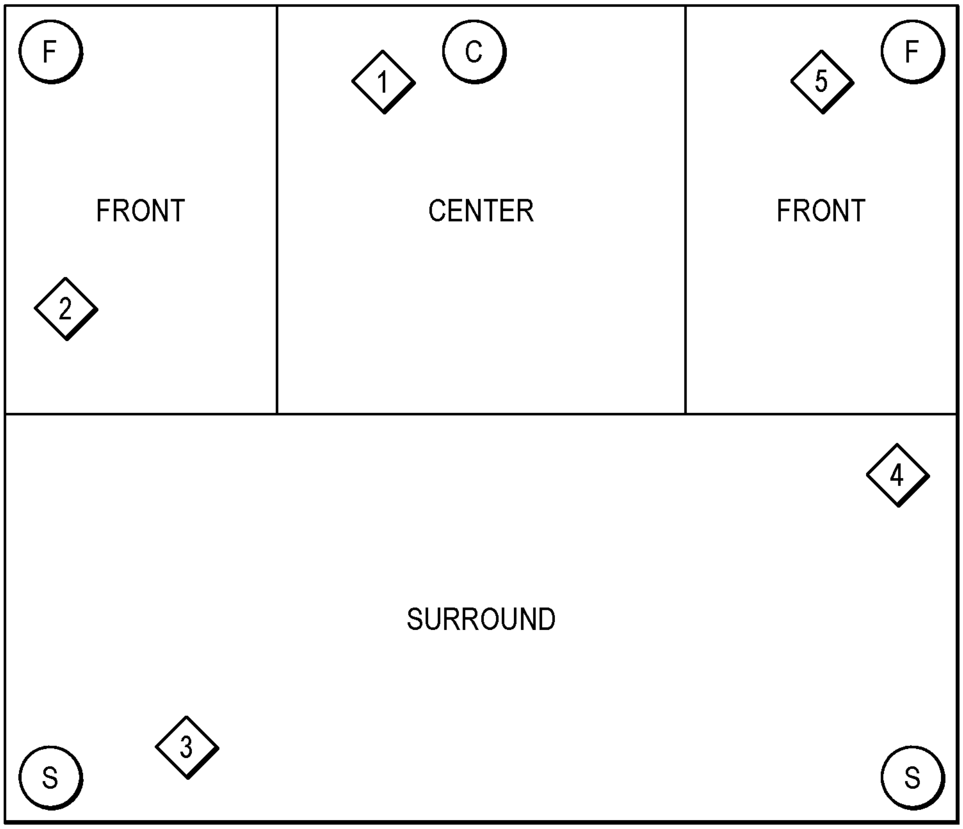
FIG. 8 shows an example of nominal spatial positions overlaid on the spatial zones and speakers of FIG. 7.

FIG. 8 shows an example of nominal spatial positions overlaid on the spatial zones and speakers of FIG. 7. The nominal positions are indicated by the numbered circles: associated with the front zone are two positions located at the top corners of the square, associated with the center zone is a single position at the top middle of the square, and associated with the surround zone are two positions at the bottom corners of the square.

To compute a speaker participation value for a spatial zone, each of the nominal positions associated with the zone may be rendered through the renderer to generate speaker activations associated with that position. These activations may, for example, be a gain for each speaker in the case of CMAP or a complex value at a given frequency for each speaker in the case of FV. Next, for each speaker and zone, these activations may be accumulated across each of the nominal positions associated with the spatial zone to produce a value $g_{ij}[f]$. This value represents the total activation of speaker i for rendering the entire set of nominal positions associated with spatial zone j. Finally, the speaker participation value in a spatial zone may be computed as the accumulated activation $g_{ij}[f]$ normalized by the sum of all these accumulated activations across speakers. The weights may then be set to this speaker participation value:

$$w_{ij}[f] = \frac{g_{ij}[f]}{\sum_i g_{ij}[f]} \quad \text{Equation (H)}$$

The described normalization ensures that the sum of $w_{ij}[f]$ across all speakers i is equal to one, which is a desirable property for the weights in Equation (G).

According to some implementations, the process described above for computing speaker participation values and combining thresholds as a function of these values may be performed as a static process where the resulting combined thresholds are computed once during a setup procedure that determines the layout and capabilities of the speakers in the environment. In such a system it may be assumed that once set up, both the dynamics processing configuration data of the individual loudspeakers and the manner in which the rendering algorithm activates loudspeakers as a function of desired audio signal location remains static. In certain systems, however, both these aspects may vary over time, in response to changing conditions in the playback environment for example, and as such it may be desirable to update the combined thresholds according to the process described above in either a continuous or event-triggered fashion to take into account such variations.

Examples of Mapping Audio Signal Components Involving an Effort Signal

The time- and frequency-varying mapping of the component signals of a spatial audio mix, also referred to here as audio objects, may be represented generally by the following equation:

$$S_j(f,t) = \sum_{i=1}^{N_o} H_{ij}(f,t) O_i(f,j) \quad (1)$$

Here the variables t and f represent the time and frequency variation of the audio object signals $O_i$, the loudspeaker signals $S_j$, and the mapping $H_{ij}$ from object i to loudspeaker signal j. The number of audio objects is given by $N_o$, where $N_o \geq 2$, and the number of loudspeaker signals is given by $N_s$, where $N_s \geq 2$. The mapping $H_{ij}$ may be thought of generically as a time-varying filter whose form and application may take numerous forms, such as real or complex time-varying gains applied to individual bands of a filterbank such as a quadrature mirror filter (QMF) or short-time Fourier transform (STFT), a time-varying finite impulse response (FIR) filter or a time-varying infinite impulse response (IIR) filter applied to the audio objects in the time-domain, etc.

According to this example, associated with each audio object signal $O_i$ is an intended perceived spatial position $\vec{o}_i(t)$ that may vary over time. As one example, such a position might correspond to time-varying 3D (x,y,z) metadata of an audio object that is part of a Dolby Atmos™ spatial audio mix. In another example, the audio object signal may correspond to a channel in a multi-channel signal, such as a Dolby 5.1 signal, and the desired position may be fixed. In either case, the intended perceived spatial position $\vec{o}_i(t)$ may have been selected by an audio content creator. In this example, associated with each loudspeaker signal $S_j$ is an assumed physical location $\vec{s}_j$ of the loudspeaker, and the set $\{\vec{s}_k\}$ represents all loudspeakers positions for loudspeakers k=1 . . . . $N_s$.

For a given audio object signal i and loudspeaker j, the signal $E_{ij}(f,t)$ represents the time and frequency varying representation of loudspeaker signal level associated with object i relative to a maximum playback limit of loudspeaker j. For brevity, this will hence forth be referred to as the effort signal. As the effort signal increases in level, this indicates that the rendering of object i on loudspeaker j will result in loudspeaker j approaching or exceeding its playback limit threshold. The set $\{E_{ik}(f,t)\}$ represents the effort signals associated with object i for all loudspeakers k=1 . . . . $N_s$.

Computation of the mapping $H_{ij}$ may then be computed as a function of the object position $\vec{o}_i(t)$, the set of loudspeaker positions $\{\vec{s}_k\}$, and the set of effort signals $\{E_{ik}(f,t)\}$, for example as follows:

$$H_{ij}(f,t) = M_j\{\vec{o}_i(t) | \{\vec{s}_K\}, \{E_{ik}(f,t)\}\} \quad (2a)$$

In this example, the mapping function $M_j$ computes the mapping $H_{ij}$ across all loudspeakers signals with the goal of making the perceived spatial location of audio object $O_i$ approximately match $\vec{o}_i(t)$ when all loudspeaker signals are played back simultaneously over loudspeakers located at the given positions $\{\vec{s}_k\}$. In other words, each mapping is computed to approximately achieve the intended perceived spatial position of an associated audio signal when the loudspeaker signals are played back over two or more corresponding loudspeakers located at associated loudspeaker positions. In some examples, "approximately achieving" the intended perceived spatial position of an associated audio signal may involve minimizing a difference between a perceived spatial position and the intended perceived spatial position, given available loudspeakers and associated loudspeaker positions. In addition, in this example achieving this approximation is subject to behavioral constraints imposed by the effort signals. For a fixed object position, the mapping $H_{ij}$ should decrease as the effort signal $E_{ij}(f,t)$ increases above some threshold $\mu_j$ while at the same time the mapping $H_{ik}$ should increase for one or more other loudspeakers k for which their effort signal is less than a threshold $\mu_k$. This behavior may be described more precisely by considering the discussed quantities at two moments in time, $t_1$ and $t_2$:

If $E_{ij}(f,t_2) > E_{ij}(f,t_1) > M_j$, with $\vec{o}_i(t_2) = \vec{o}_i(t_1)$, then $|H_{ij}(f,t_2)| < |H_{ij}(f,t_1)|$ and $|H_{ik}(f,t_2)| > |H_{ik}(f,t_1)|$ for one or more other speakers k≠j where $E_{ik}(f,t_1)$ and $E_{ik}(f,t_2) < \mu_k$.

The above mathematically-stated behavior encapsulates the high-level idea that, according to some examples, when the level of the spatial mix approaches the playback limit thresholds of a particular loudspeaker, mapping of components into that loudspeaker is reduced in favor of increasing the mapping into other loudspeakers where the spatial mix level is further from their limit thresholds.

In general, the frequency-varying mapping described above may be implemented across the entire audible frequency range, employing a frequency resolution commensurate with that of human perception. For example, in one embodiment, the mapping may be computed for 20 discrete frequency bands with a resolution of roughly 2 ERB (Equivalent Rectangular Bandwidth). Utilizing such a spacing helps maintain the perceptual transparency of the system.

In other embodiments, however, it may be advantageous to only compute the dynamic mapping over a subset of the available frequency range of the speakers. For example, the dynamic mapping may only be calculated on the frequencies less than a threshold frequency, such as 500 Hz, a range over which there may exist differences in the capabilities of the loudspeakers. Above 500 Hz—or above another threshold—where all loudspeakers may be equally capable in some examples, the mapping could be independent of signal level in some such examples.

According to some examples, "approximately achieving" the intended perceived spatial position of an associated audio signal may involve minimizing a cost function. In some such examples, the mapping described by Equation 2a may be advantageously achieved by treating the goal of making the perceived spatial location of audio object $O_i$ approximately match $\vec{o}_i(t)$ when all loudspeaker signals are played back simultaneously over loudspeakers located at the given positions $\{\vec{s}_k\}$ as one of cost function minimization. According to some such examples, the cost function may be expressed as follows:

$$C(g) = C_{spatial}(g, \vec{o}, \{\vec{s}_k\}) + C_{proximity}(g, \vec{o}, \{\vec{s}_k\}) + \Sigma_i C_i(g, \{\{\hat{o}\}, \{\hat{s}_k\}, \{\hat{e}\}\}_i) \quad (2b)$$

In Equation 2b, C(g) represents the cost C as a function of g, which represents an $N_s$-dimensional vector of speaker activations. In Equation 2b, the set $\{\vec{s}_k\}$ represents the positions of a set of $N_s$ loudspeakers and $\vec{o}$ denotes the desired perceived spatial position of the audio signal. In this example, the first term of Equation 2b, $C_{spatial}$, models how closely a desired spatial impression is achieved as a function of mapping an audio object into loudspeaker signals, and the second term $C_{proximity}$ assigns a cost to activating each of the loudspeakers. One purpose of the term $C_{proximity}$ is creating a sparse solution in which only loudspeakers in close proximity to the intended spatial position of the object signal are activated. According to this example, the cost function includes one or more additional dynamically configurable terms to the activation penalty, allowing the spatial rendering to be modified in response to numerous other controls. In Equation 2b, the terms $C_l(g, \{\{\hat{o}\}, \{\hat{s}_k\}, \{\hat{e}\}\}_l)$ represent these additional cost terms, with $\{\hat{o}\}$ representing a set of one or more properties of the audio signals (e.g., of an object-based audio program) being rendered, $\{\hat{s}_k\}$ representing a set of one or more properties of the speakers over which the audio is being rendered, and $\{\hat{e}\}$ representing one or more additional external inputs. Each term $C_l(g, \{\{\hat{o}\}, \{\hat{s}_i\}, \{\hat{e}\}\}_l)$ returns a cost as a function of activations g in relation to a combination of one or more properties of the audio signals, speakers, and/or external inputs, represented generically by the set $\{\{\hat{o}\}, \{\hat{s}_k\}, \{\hat{e}\}\}_l$. In some examples, the set $\{\{\hat{o}\}, \{\hat{s}_k\}, \{\hat{e}\}\}_l$ contains at a minimum only one element from any of $\{\hat{o}\}$, $\{\hat{s}_k\}$, or $\{\hat{e}\}$.

Examples of $\{\hat{o}\}$ include but are not limited to:

Desired perceived spatial position of the audio signal;

Level (possible time-varying) of the audio signal; and/or

Spectrum (possibly time-varying) of the audio signal.

Examples of $\{\hat{s}_k\}$ include but are not limited to:

Locations of the loudspeakers in the listening space;

Frequency response of the loudspeakers;

Playback level limits of the loudspeakers;

Parameters of dynamics processing algorithms within the speakers, such as limiter gains;

A measurement or estimate of acoustic transmission from each speaker to the others;

A measure of echo canceller performance on the speakers; and/or

Relative synchronization of the speakers with respect to each other.

Examples of $\{\hat{e}\}$ include but are not limited to:

Locations of one or more listeners or talkers in the playback space;

A measurement or estimate of acoustic transmission from each loudspeaker to the listening location;

A measurement or estimate of the acoustic transmission from a talker to the set of loudspeakers;

Location of some other landmark in the playback space; and/or

A measurement or estimate of acoustic transmission from each speaker to some other landmark in the playback space.

By mapping the effort signals $E_{ij}(f,t)$ to the per-loudspeaker activation penalties of Equation 2b, the stated goals of the mapping function $M_j$ may be realized in a process that simultaneously optimizes the mapping $H_{ij}$ across all loudspeakers $j=1 \ldots N_s$ for each individual audio object i. More specifically, for any particular frequency f, time t, and object signal i, $$H_{ij}=\hat{g}_j, j=1 \ldots N_s, \tag{2c}$$

where $\hat{g}_j$ is the jth element of the vector $\hat{g}$ which minimizes the cost function in Equation 2b:

$$\hat{g} = \min_g C(g) \tag{2d}$$

The exact manner in which the effort signals $E_{ij}(f,t)$ may represent loudspeaker signal level with respect to maximum playback limits is varied and the present inventors contemplate many possible options. In some implementations, the effort signal may be, or may correspond to, a digital level that is either the input to or the output from a limiter. In other implementations the effort signal may be the actual gains applied by a limiter, a signal indicative of speaker levels having exceeded a playback threshold. In some other implementations, the effort signal may be an acoustic signal (e.g., measured in decibels of sound pressure level (dBSPL) at a particular distance). The acoustic signal may, for example, be derived from a digital level using the loudspeaker sensitivity and known analog amplifier gains.

Whatever the particular form of representation, construction of the effort signals $E_{ij}(f,t)$ is a significant component to the functioning of many examples of the present disclosure, because in those examples the effort signals $E_{ij}(f,t)$ dictate where and when the diversion of signal energy between loudspeakers occurs. As previously stated, the effort signals may be computed for each audio object signal as a function of one or more of audio object signals and their perceived spatial positions, e.g., as follows:

$$E_{ij}(f,t)=F_{ij}\{\{O_k(f,t)\},\{\vec{o}_k(t)\}\} \tag{3}$$

By considering the entire spatial mix in their construction, signal energy from any part of the spatial mix may be combined into each object's effort signals for a variety of purposes. One of these possible purposes is to combine object signals in a manner that is representative of how the audio object signals will likely accumulate into loudspeaker signals. Another possible purpose is to tie together the energy redistribution behavior of the present invention between objects with particular spatial relationships. Some preferred constructions of the effort signals can achieve both of these objectives.

In considering a preferred construction of the effort signals, it is convenient to revisit their more verbose definition: a time and frequency varying representation of loudspeaker signal level associated with object i relative to a maximum playback limit of loudspeaker j. This notion of a general representation may be literally translated to the following specific construction of the effort signals:

$$E_{ij}(f,t)=10\log_{10}(L_i(f,t)-r_j(f)) \tag{4}$$

In Equation 4, the term $L_i(f,t)$ represents a time- and frequency-varying signal level associated with object i, and $\tau_j(f)$ represents a frequency-varying playback limit for loudspeaker j. In some examples, it is assumed that the playback limits of the loudspeakers, which are represented in decibels in this instance, have already been characterized and provided to a control system, similar to the loudspeaker positions. As such, the computation of the audio object's effort signals across all loudspeakers simplifies to the computation of the single level signal $L_i(f,t)$.

As stated earlier, these audio object level signals $L_i(f,t)$, on which the mapping $H_{ij}$ depends, should be representative of how the audio object signals will likely accumulate into loudspeaker signals. This is a circular relationship, because the mapping $H_{ij}$ is used to explicitly generate the speaker signals, as shown in Equation 2a. One solution for resolving this circularity issue is to produce a simple zone-based rendering of the audio objects, where no information about the loudspeakers is required. Rather, signal energy for a finite set of spatial zones may be generated through a simple panning rule. In general, the control system may employ $N_z$ zones. In one useful embodiment, the rendering process may involve four zones, which may be the front, center, surround, and overhead zones. Other examples may involve more or fewer zones. In some such examples, rendering an audio object into a zone may be governed by a simple broadband panning rule that is a function of the audio object's intended spatial position:

$$g_{il}(t)=P_l\{\vec{o}_i(t)\} \quad (5)$$

In Equation 5, $g_{il}(t)$ represents panning gains of audio object i into spatial zones l. It is beneficial for the panning gains to be power preserving across the set of $N_z$ zones, for example as follows:

$$\sum_{l=1}^{N_z} g_{il}^2(t) = 1 \quad (6)$$

From these zone panning gains, time and frequency varying zone power spectra $Z_l(f,t)$ may be computed by accumulating the power spectra of the audio objects weighted by their corresponding panning gains, for example as follows:

$$Z_l(f, t) = \sum_{i=1}^{N_o} g_{il}^2(t)|O_i(f, t)|^2 \quad (7)$$

These zone power spectra correspond to the energy distribution of the overall spatial mix within the designed spatial zones. With the assumption that speakers are distributed across the zones—for example, it is desirable for each zone to include at least one loudspeaker—these power spectra represent a reasonable approximation to the signal levels that would appear in speaker signals within a zone.

Unique to this disclosure—so far as the present inventors are aware—in some examples the zone power spectra may then be mapped back into the object level signals $L_i(f,t)$ through application of each object's zone panning gains, e.g., as follows:

$$L_i(f, t) = \sum_{l=1}^{N_z} g_{il}^2(t) Z_l(f, t) \quad (8)$$

To the extent that the audio object i is panned across multiple zones, the construction of $L_i(f,t)$ according to Equation 8 combines zone power spectra in a manner proportional to this panning. $L_i(f,t)$ thereby serves as an approximation to the levels of loudspeaker signals to which object i is likely to be rendered. Additionally, the signals $L_i(f,t)$ for objects that largely belong to the same zones will be similar, meaning that the behavior of the dynamic energy re-distribution of the present invention will be similar for these objects. In some advantageous embodiments, the zones may be designed to combine objects across the left/right axis, thereby constraining the behavior of the energy re-distribution to be similar for the left and right of the spatial mix. This zone design helps to reduce perceptually distracting left/right image shifting.

Finally, in some examples the object level signals $L_i(f,t)$ may be combined with the speaker limit thresholds $\tau_j(f)$ to compute the effort signals $E_{ij}(f,t)$, for example as shown in Equation 4.

In cases where the spatial audio mix consists of channel-based audio (i.e. where each audio object signal may correspond to a channel in a multi-channel signal, such as a Dolby 5.1 signal or a Dolby 5.1.4 signal, and the desired position of each object is a fixed spatial location), the zone-based construction of the level signals just described may be simplified along a number of dimensions. Because the locations of the object/channel signals are fixed, the mapping of channels into zones may not require a dynamic panning function as shown in Equation 5. Furthermore, this mapping may simplify to a set of one-to-one mappings from channels to zones and back. For example, for a 5.1.4 signal, the front left and right channels may map into the front zone, the center channel may map into the center zone, the left and right surround channels may map into the surround zone, and all four overhead channels may map into the overhead zone. With this mapping, Equation 7 for computing a zone power spectrum simplifies to summing over the power spectra of each channel belonging to that zone, and Equation 8 simplifies to equating each channel's level signal equal to the zone power spectrum corresponding to the single zone to which that channel is mapped.

The above-described method of computing the object level signals relies on an approximation to the manner in which objects accumulate into speaker signals. To eliminate this approximation, but at the expense of introducing delay into the activation of the present invention's energy re-distribution, alternative constructions of the object level signals employing direct feedback of the speaker signals from a previous time interval may be employed. Accordingly, this second category of methods may be referred to herein as feedback methods.

One such alternative implementation is similar to the method represented by Equation 8, except with the zone power spectra replaced by the power spectra of the speaker signals from the previous time interval and the object-to-zone panning gains replaced by a normalized version of the object-to-speaker mapping from the previous time interval, for example as follows:

$$L_i(f, t) = \sum_{j=1}^{N_s} \left|\hat{H}_{ij}(f, t-1)\right|^2 |S_j(f, t-1)|^2 \quad (9a)$$

$$\hat{H}_{ij}(f, t) = \frac{H_{ij}(f, t)}{\sqrt{\sum_{k=1}^{N_s} \left|H_{ik}(f t)\right|^2}} \quad (9b)$$

The normalization of the object-to-speaker mapping shown in Equation 9b ensures that the weighted combination of speaker signals in Equation 9a is performed in a power-preserving manner. If the object-to-speaker mapping is inherently computed in a power-preserving manner, as may be the case in some advantageous embodiments, then this normalization step may be unnecessary.

The construction of the object level signals in Equation 9a combines all the speaker signals from the previous time interval in proportion to the mapping of that audio object into each of the speaker signals. As such, it is a direct representation of speaker signal levels to which that audio object is being mapped. One issue with this construction, however, is that it lacks any notion of associating audio objects within similar spatial zones. The absence of this feature may introduce instabilities in the imaging of the resulting rendered audio.

As a third example of constructing the audio object level signals, the zone-based processing of the first example may be combined with the more accurate representation of speaker signal levels afforded by the feedback methods of the second example. In some such alternative examples, the audio object level signal may be constructed as the weighted sum of zone signals, as in the first example, but the zone power spectrum $Z_l(f,t)$ may be replaced by a speaker zone power spectrum $V_l(f,t)$, for example as follows:

$$L_i(f,t) = \sum_{l=1}^{N_z} g_{il}^2(t) V_l(f,t) \tag{10}$$

Whereas the zone power spectra are computed directly from the object signals, the speaker zone power spectra are computed as weighted sums of the speaker signal power spectra from the previous time interval:

$$V_l(f,t) = \sum_{j=1}^{N_s} P_{jl}(f,t-1)|S_j(f,t-1)|^2 \tag{11}$$

The weighting Pit may be referred to herein as a "speaker zone participation value," which is meant to be a measure of the portion of a zone signal l's energy that will be rendered into speaker j. The weighting $P_{jl}$ may be derived by normalizing across a set of raw speaker zone participation values $\hat{P}_{jl}$:

$$P_{jl}(f,t) = \frac{\hat{P}_{jl}(f,t)}{\sum_{k=1}^{N_s} \hat{P}_{kl}(f,t)} \tag{12}$$

The raw speaker zone participation value $\hat{P}_{jl}$ may be computed by using the mapping function $M_j$ to simulate the rendering of a set of $N_l$ spatial locations $\vec{p}_{ln}$ for each zone that are representative of the spatial extent of that zone. The power spectra of the $N_l$ mappings resulting from this simulated rendering may be summed together to compute the raw zone speaker participation, for example as follows:

$$P_{jl}(f,t) = \sum_{n=1}^{N_l} \left| M_j\{\vec{p}_{ln} \mid \{\vec{s}_k\}, \{\hat{E}_{lk}(f,t)\}\} \right|^2 \tag{13}$$

The effort signals $\hat{E}_{lj}(f,t)$ associated with this simulated rendering may, in some examples, be computed from the zone power spectra $Z_l(f,t)$ defined in Equation 7:

$$\hat{E}_{lj}(f,t) = 10 \log_{10}(Z_l(f,t)) - \tau_j(f) \tag{14}$$

In summary, three different methods for construction of the object level signals $L_i(f,t)$ are described above: 1) a zone-based method; 2) a feedback-based method, and 3) a hybrid method that combines elements of the zone-based method and the feedback-based method.

In all of the methods described above for constructing the object level signals, further processing may be applied to reduce perceptual artifacts. For example, the object level signals $L_i(f,t)$ may be smoothed across time, frequency or both in order to regularize variations in the resulting energy spreading across these dimensions.

Defining the effort signals $E_{ij}(f,t)$ as shown in Equation 4 allows for a very efficient implementation of the invention using a single data structure, such as a lookup table of audio object to speaker mappings that are indexed by intended audio object position $\vec{o}_i(t)$ and the audio object level signal $L_i(f,t)$. The lookup table may, for example, be constructed by sampling $\vec{o}_i(t)$ across all possible intended object positions—or at least across a reasonable number of intended object positions—and by sampling $L_i(f,t)$ across a meaningful range of object level signal values. As previously stated, the intended object position $\vec{o}_i(t)$ might correspond to time-varying 3D (x,y,z) metadata of an audio object.

Figure 9:
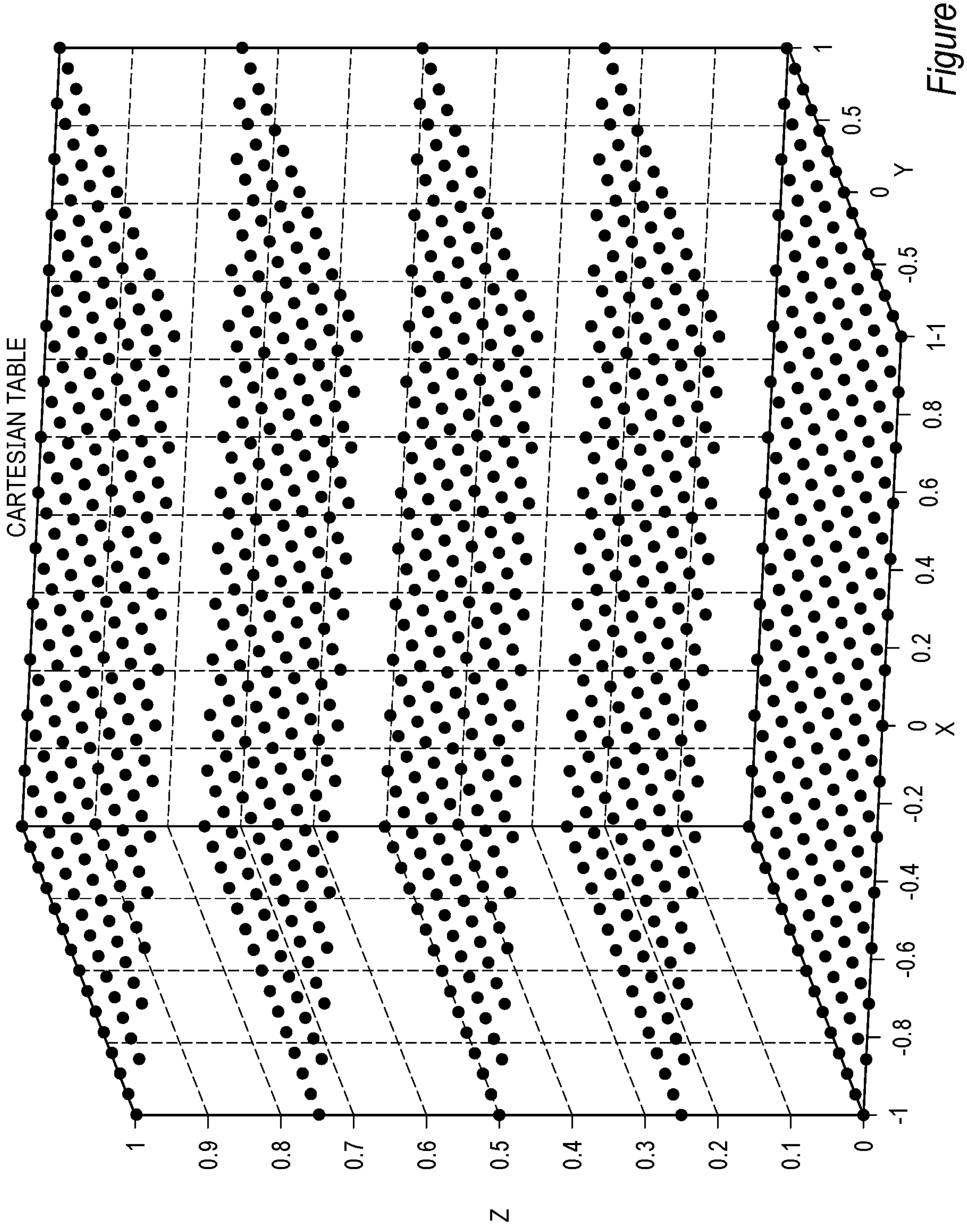
FIG. 9 is a graph of points indicating object to speaker mappings in an example embodiment.

FIG. 9 is a graph of points indicating mapping of audio objects to speakers as a function of the x, y, and z coordinates of an audio object, in an example embodiment. In this example, the x and y dimensions are sampled with 15 points and the z dimension is sampled with 5 points. Other implementations may include more samples or fewer samples. According to this example, each point represents the mapping $H_{ij}$ for the set of j=1 . . . . $N_s$ loudspeakers for an audio object i with the (x,y,z) position corresponding to that point.

Figure 10:
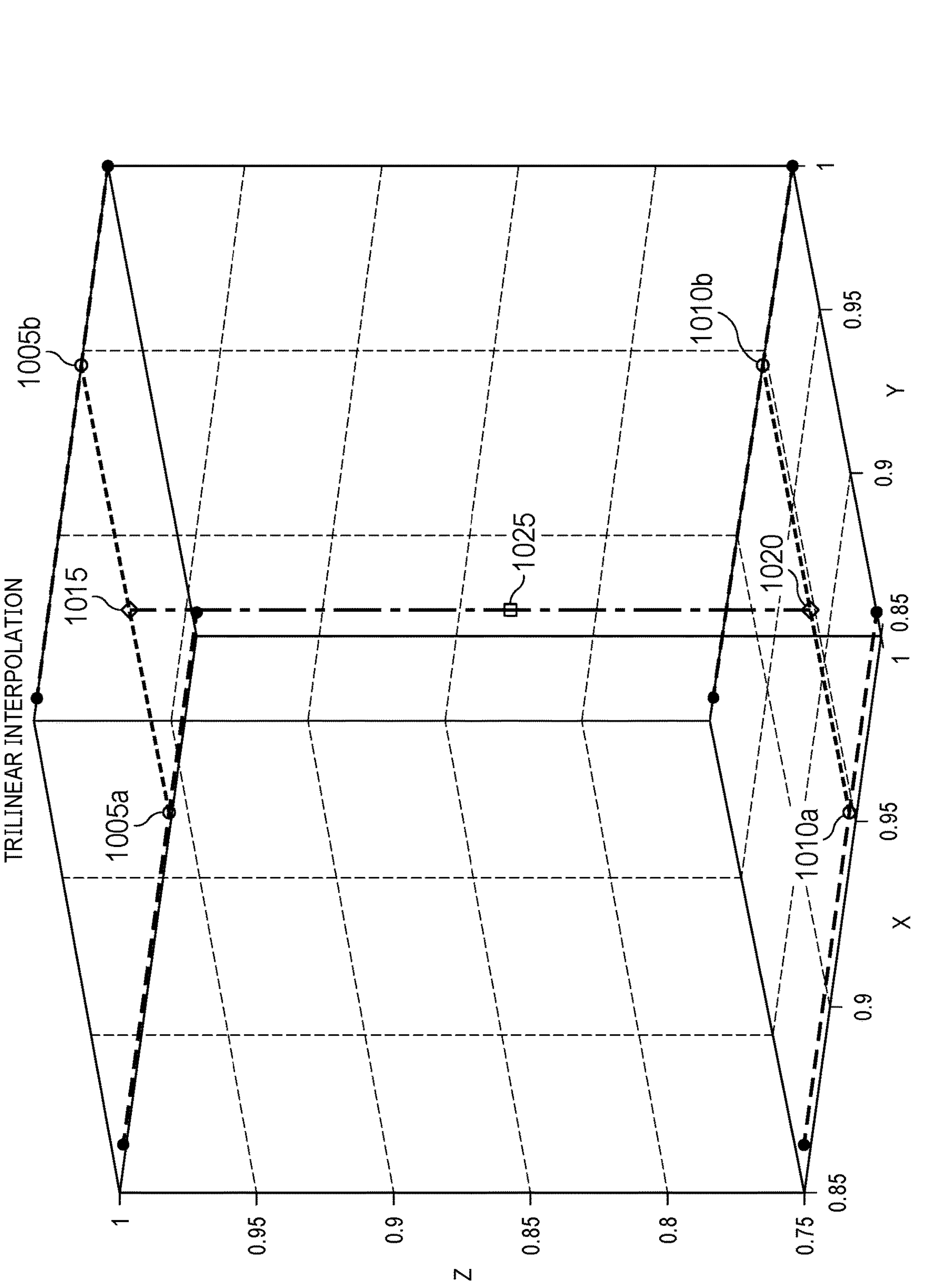
FIG. 10 is a graph of tri-linear interpolation between points indicative of object to speaker mappings according to one example.

At runtime, to determine the actual mapping for each speaker, tri-linear interpolation between the speaker mappings of the nearest 8 points may be used in some examples. FIG. 10 is a graph of tri-linear interpolation between points indicative of speaker mappings according to one example. In this example, the process of successive linear interpolation includes interpolation of each pair of points in the top plane to determine first and second interpolated points 1005*a* and 1005*b*, interpolation of each pair of points in the bottom plane to determine third and fourth interpolated points 1010*a* and 1010*b*, interpolation of the first and second interpolated points 1005*a* and 1005*b* to determine a fifth interpolated point 1015 in the top plane, interpolation of the third and fourth interpolated points 1010*a* and 1010*b* to determine a sixth interpolated point 1020 in the bottom plane, and interpolation of the fifth and sixth interpolated points 1015 and 1020 to determine a seventh interpolated point 1025 between the top and bottom planes. Although tri-linear interpolation is an effective interpolation method, one of skill in the art will appreciate that tri-linear interpolation is just one possible interpolation method that may be used in implementing aspects of the present disclosure, and that other examples may include other interpolation methods.

The above-described methods may be further extended by adding a 4th dimension to the lookup table to cover varying audio object signal levels. This lookup along the fourth dimension of signal level may, in some examples, be performed independently across a set of frequency bands, explicitly capturing the exact nature in which $L_i(f,t)$ varies across frequency.

Some alternative channel-based examples involve making an interpolation of the level, such as a linear interpolation, without making a trilinear interpolation (or, in some examples, any interpolation) of the positions.

In another alternative embodiment, the object level signal may be approximated as a broadband gain multiplied with a prototype spectral shape, for example as follows:

$$\tilde{L}_i(f,t) = g_i(t) L_p(f) \tag{15}$$

In Equation 15, the prototype spectral shape $L_p(f)$ is chosen to represent an average spectral shape associated with content expected to be processed by the system. The gain $g_i(t)$ is computed to minimize an error between the estimated object level signal $L_i(f,t)$ calculated by one of the foregoing methods and its approximation $\tilde{L}_i(f,t)$. The lookup table may be constructed with the assumption that the object signal level spectrum follows the form of Equation 15, thereby allowing the lookup of signal level to be indexed by the single broadband gain $g_i(t)$ for all frequency bands. This approximation may therefore result in reduced computational complexity by reducing the number of operations required for (15) interpolation between points of the table.

Returning now to the computation of the mapping $H_{ij}$ as a function of the effort signals $E_{ij}(f,t)$ in accordance with Equation 2b, it may be necessary to map the effort signals to per-speaker penalties $P_j(f)$ during the optimization of the mapping for each object i. Considering the construction of the effort signals in Equation 4, we note that the effort signals are less than zero when the audio object level signal is less than the speaker playback limit threshold and greater than zero when the audio object signal is greater than this threshold. In mapping these effort signals to speaker penalties, it can be useful to apply a transformation such that the penalty smoothly increases monotonically from a value of zero as the effort signal increases above some specified transition point. Specifying this transition point to correspond to an effort value less than zero means that the penalty will begin to activate prior to the signal level having reached the playback threshold of the loudspeaker. Such examples have the advantageous effect of diverting energy away from a loudspeaker gradually before signal levels reach the playback limit. According to some such examples, a knee parameter, K, may be used to control the transition point as well as the rate at which the penalty increases as the effort signal increases.

Figure 11:
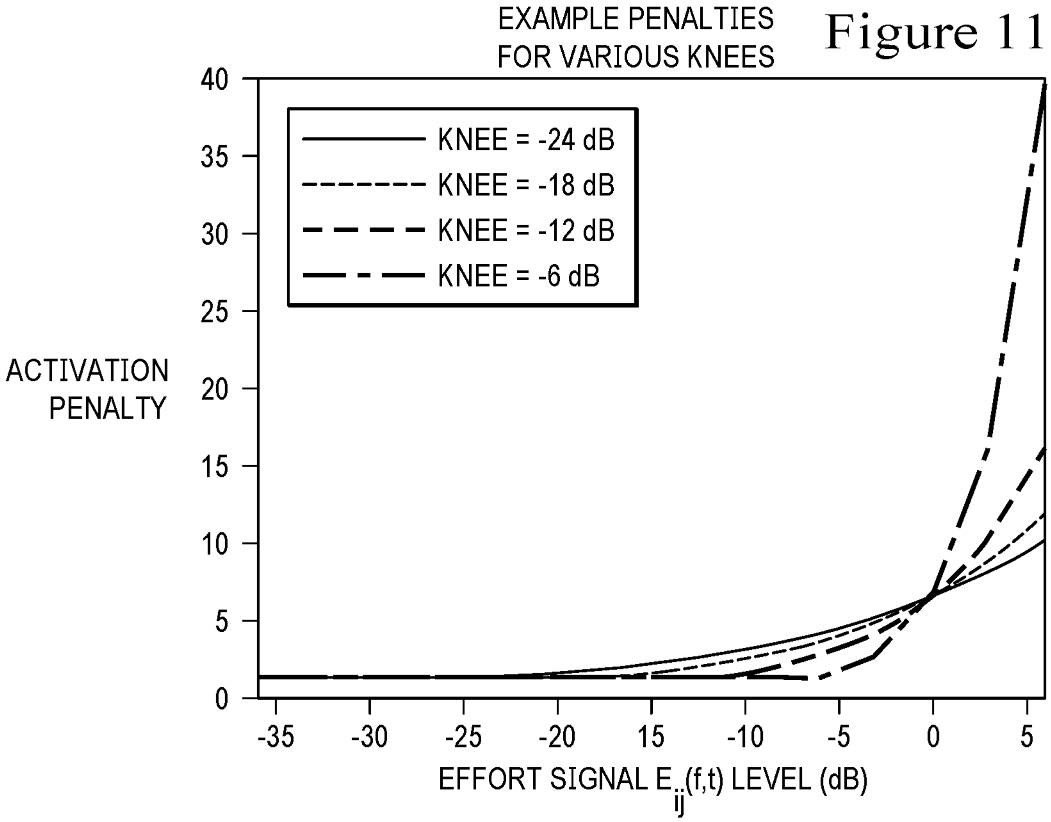
FIG. 11 shows examples of penalties for various knee parameters.

FIG. 11 shows examples of penalties for various knee parameters. FIG. 11 depicts how the loudspeaker penalty increases for knee values ranging from −24 dB to −6 dB. One may observe that below the knee value, the penalty is zero (that value for which is has no effect on computing the mapping). According to these examples, the penalty increases monotonically above the knee value, meaning that energy will be increasingly diverted from the associated loudspeaker as the effort signal increases. In addition, we see that larger knee values correspond to a more gradual activation of the speaker penalty. In practice, the present inventors have determined that a knee value in the range of −18 dB to −12 dB works well.

The knee value K is an example of a parameter that may be used to control the degree of energy diversion between loudspeakers as a function of signal level. In some embodiments, the degree of this energy diversion may be fixed for all content processed by the system. In other embodiments, the degree of this diversion may be additionally controlled based upon the input audio format, codec, or metadata. For example, some codecs may incorporate metadata indicating that certain components of the mix are more eligible for more energy diversion than others. This metadata, or the basis for the metadata may, for example, be controlled by a content creator specifying different knee values for different audio objects in a Dolby Atmos™ mix. Additionally, in some examples the degree of energy diversion may depend, at least in part, on the content format. For example, the degree of energy diversion for the center channel of a Dolby 5.1 mix might be set less than the degree of energy diversion for the other channels, in order to cause the perceived location of dialog to remain in the center.

Figure 12:
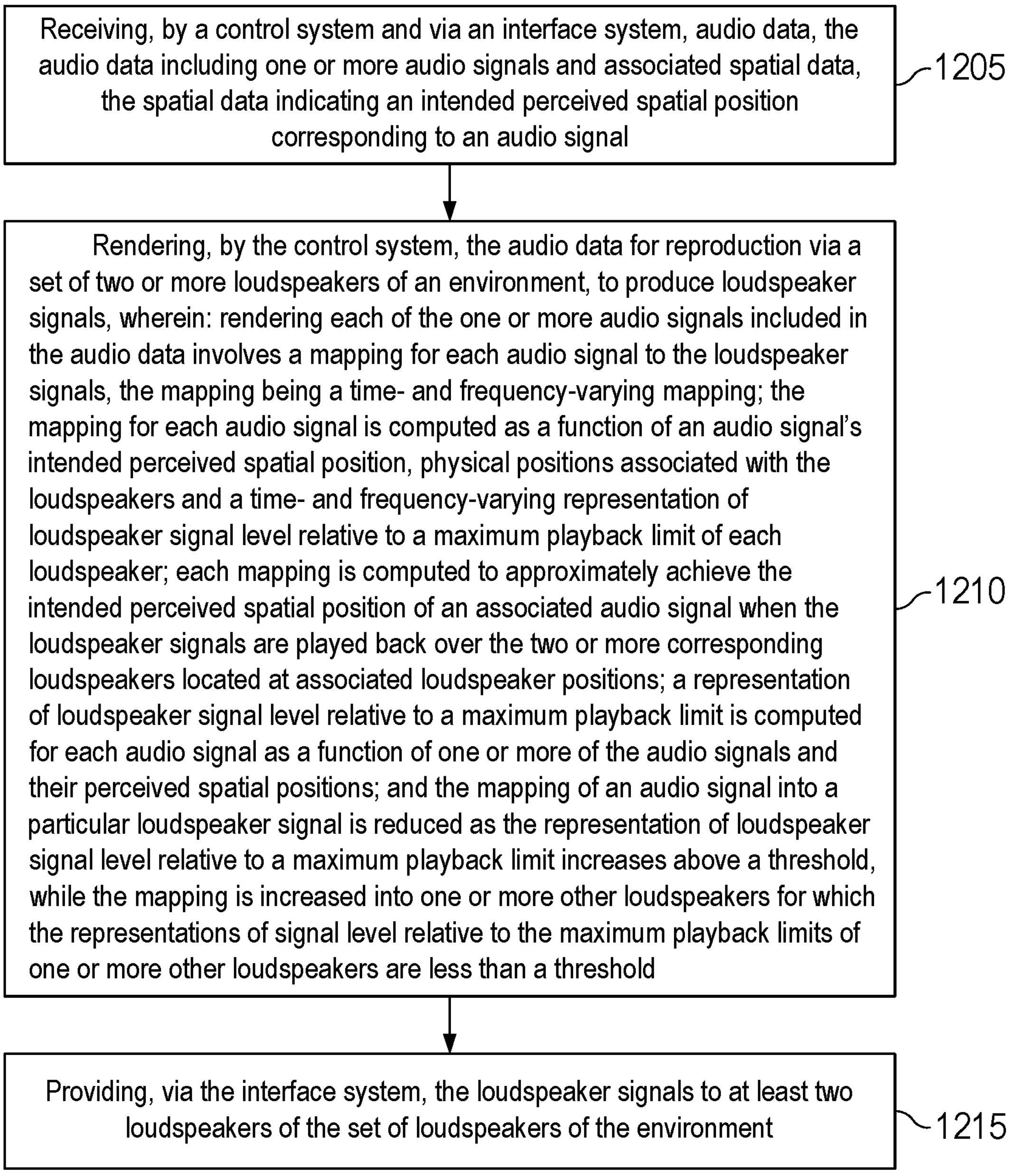
FIG. 12 is a flow diagram that outlines one example of a method that may be performed by an apparatus or system such as those disclosed herein.

FIG. 12 is a flow diagram that outlines one example of a method that may be performed by an apparatus or system such as those disclosed herein. The blocks of method 1200, like other methods described herein, are not necessarily performed in the order indicated. In some implementation, one or more of the blocks of method 1200 may be performed concurrently. Moreover, some implementations of method 1200 may include more or fewer blocks than shown and/or described. The blocks of method 1200 may be performed by one or more devices, which may be (or may include) a control system such as the control system 110 that is shown in FIG. 1 and described above, or one of the other disclosed control system examples.

According to this example, block 1205 involves receiving, by a control system and via an interface system, audio data. In this example, the audio data includes one or more audio signals and associated spatial data. Here, the spatial data indicates an intended perceived spatial position corresponding to an audio signal. In some examples the spatial data may be, or may include, spatial metadata of an object-based audio format such as Dolby Atmos™. In some examples, the intended perceived spatial position may be represented as $\vec{o}_i(t)$, as disclosed herein. In some instances the spatial data may be, or may correspond with, channels of a channel-based audio format such as a Dolby 5.1, Dolby 5.1.2, Dolby 7.1, Dolby 7.1.4 or Dolby 9.1 format. Accordingly, the intended perceived spatial position may correspond with a channel of a channel-based audio format, may correspond with metadata, or may correspond with both the channel and the metadata.

In this example, block 1210 involves rendering, by the control system, the audio data for reproduction via a set of two or more loudspeakers of an environment, to produce loudspeaker signals. According to this example, rendering each of the one or more audio signals included in the audio data involves a time- and frequency-varying mapping for each audio signal to the loudspeaker signals. In this example, the mapping for each audio signal is computed as a function of an audio signal's intended perceived spatial position, physical positions associated with the loudspeakers and a time- and frequency-varying representation of loudspeaker signal level relative to a maximum playback limit of each loudspeaker. According to this example, each mapping is computed to approximately achieve the intended perceived spatial position of an associated audio signal when the loudspeaker signals are played back over the two or more corresponding loudspeakers located at associated loudspeaker positions.

According to some examples, "approximately achieving" the intended perceived spatial position of an associated audio signal may involve minimizing a difference between a perceived spatial position and the intended perceived spatial position, given available loudspeakers and associated loudspeaker positions. In some examples, approximately achieving the intended perceived spatial position of an associated audio signal may involve minimizing a cost function, such as one of the cost functions disclosed herein. Equation 2b of the present disclosure encompasses many different possibilities, depending on the selection of the cost terms. For example, various implementations may be achieved according to selection of the additional cost terms $\{\hat{s}_i\}$ and $\{\hat{e}\}$.

In this example, block 1210 involves computing a representation of loudspeaker signal level relative to a maximum playback limit for each audio signal as a function of one or more of the audio signals and their perceived spatial positions. According to this example, block 1210 involves reducing the mapping of an audio signal into a particular loudspeaker signal as the representation of loudspeaker signal level relative to a maximum playback limit increases above a threshold. Moreover, in this example, block 1210 involves increasing the mapping into one or more other loudspeakers for which the representations of signal level relative to the maximum playback limits of one or more other loudspeakers are less than a threshold.

According to some examples, the mapping may be computed over the entire audible frequency range for normal humans. However, in some examples, the mapping may be computed over a subset of the audible frequency range.

According to some examples, the mapping may involve minimizing a cost function including a first term that models how closely the intended perceived spatial position is achieved as a function of mapping an audio signal into loudspeaker signals, and a second term that assigns a cost to activating each of the loudspeakers. Equation 2b provides examples of both the first term and the second term. In some examples, the cost of activating each loudspeaker may be based, at least in part, on a function of the representation of loudspeaker signal level relative to the maximum playback limit.

In some examples, the representation of loudspeaker signal level relative to the maximum playback limit may correspond to one or more of a digital signal level, a limiter gain, or an acoustic signal level. According to some examples, the representation of loudspeaker signal level relative to the maximum playback limit may be computed as a difference between a level estimate for each audio signal and playback limit thresholds for each loudspeaker. In some such examples, the level estimate for each audio signal may be based, at least in part, on a zone-based rendering of all the audio signals. In some examples, the level estimate for each audio signal may be based, at least in part, on previously-computed loudspeaker signals. In some such examples, the level estimate for each audio signal may be further dependent upon a participation of each loudspeaker in a plurality of spatial zones. According to some examples, block 1210—or another block of method 1200—may involve smoothing the level estimate for each audio signal across time, across frequency, or across both time and frequency.

According to some examples, the mapping from audio signal to loudspeaker signals may be determined by querying a data structure indexed by the intended perceived spatial position and level estimate for each audio signal. In some examples, the mapping from audio signal to loudspeaker signals may involve determining loudspeaker activations. In some such examples, the loudspeaker activations may be determined by interpolating from a set of pre-computed speaker activations. According to some such examples, the set may be indexed by the intended perceived spatial position and level estimate for each audio signal.

In some examples, the level estimate for each audio signal may be represented as a broadband gain multiplied with a spectral shape. In some such examples, the spectral shape may be selected from a plurality of spectral shapes. Each spectral shape of the plurality of spectral shapes may, for example, correspond to a content type. The content types may, for example, include movie content, television show content, podcast content, musical performance content, gaming content, etc.

According to some examples, reducing a mapping into one loudspeaker and increasing a mapping into another loudspeaker may occurs gradually as the representation of signal level relative to a maximum playback level increases above a threshold. FIG. 11 and the corresponding description provide some examples. In some examples, method 1200 may involve controlling a degree of reduction of mapping into one loudspeaker and an increase of mapping into another loudspeaker according to one or more of an audio format, a codec, or metadata. According to some examples, method 1200 may involve controlling a degree of reduction of mapping into one loudspeaker and an increase of mapping into another loudspeaker according to a knee parameter.

In this implementation, block 1215 involves providing, via the interface system, the loudspeaker signals to at least two loudspeakers of the set of loudspeakers of the environment.

Some disclosed implementations include a system or device configured (e.g., programmed) to perform any embodiment of the disclosed methods, and a tangible computer readable medium (e.g., a disc) which stores code for implementing any embodiment of the disclosed methods or steps thereof. For example, the disclosed system can be or include a programmable general purpose processor, digital signal processor, or microprocessor, programmed with software or firmware and/or otherwise configured to perform any of a variety of operations on data, including an embodiment of the disclosed method or steps thereof. Such a general purpose processor may be or include a computer system including an input device, a memory, and a processing subsystem that is programmed (and/or otherwise configured) to perform an embodiment of the disclosed method (or steps thereof) in response to data asserted thereto.

Some embodiments of the disclosed system are implemented as a configurable (e.g., programmable) digital signal processor (DSP) that is configured (e.g., programmed and otherwise configured) to perform required processing on audio signal(s), including performance of an embodiment of the disclosed method. Alternatively, embodiments of the disclosed system (or elements thereof) are implemented as a general purpose processor (e.g., a personal computer (PC) or other computer system or microprocessor, which may include an input device and a memory) which is programmed with software or firmware and/or otherwise configured to perform any of a variety of operations including an embodiment of the disclosed method. Alternatively, elements of some embodiments of the disclosed system are implemented as a general purpose processor or DSP configured (e.g., programmed) to perform an embodiment of the disclosed method, and the system also includes other elements (e.g., one or more loudspeakers and/or one or more microphones). A general purpose processor configured to perform an embodiment of the disclosed method would typically be coupled to an input device (e.g., a mouse and/or a keyboard), a memory, and a display device.

Another aspect of the present disclosure is a computer readable medium (for example, a disc or other tangible storage medium) which stores code for performing (e.g., coder executable to perform) any disclosed method or steps thereof.

While specific embodiments and applications have been described herein, it will be apparent to those of ordinary skill in the art that many variations on the embodiments and applications described herein are possible without departing from the scope described and claimed herein. It should be understood that while certain forms have been shown and described, the scope of the present disclosure is not to be limited to the specific embodiments described and shown or the specific methods described.

The invention claimed is:

1. An audio processing method, comprising:

receiving, by a control system and via an interface system, audio data, the audio data including one or more audio signals and associated spatial data, the spatial data indicating an intended perceived spatial position corresponding to an audio signal;

rendering, by the control system, the audio data for reproduction via a set of two or more loudspeakers of an environment, to produce loudspeaker signals, wherein:

rendering each of the one or more audio signals included in the audio data involves a mapping for each audio signal to the loudspeaker signals, the mapping being a time- and frequency-varying mapping;

the mapping for each audio signal is computed as a function of an audio signal's intended perceived spatial position, physical positions associated with the loudspeakers and a time- and frequency-varying representation of loudspeaker signal level relative to a maximum playback limit of each loudspeaker;

each mapping is computed to approximately achieve the intended perceived spatial position of an associated audio signal when the loudspeaker signals are played back over the set of loudspeakers located at associated loudspeaker positions;

a representation of loudspeaker signal level relative to a maximum playback limit is computed for each audio signal as a function of one or more of the audio signals and their perceived spatial positions; and the mapping of an audio signal into a particular loudspeaker signal is reduced as the representation of loudspeaker signal level relative to a maximum playback limit increases above a threshold, while the mapping is increased into one or more other loudspeakers for which the representations of signal level relative to the maximum playback limits of one or more other loudspeakers are less than a threshold; and providing, via the interface system, the loudspeaker signals to at least two loudspeakers of the set of loudspeakers of the environment.

2. The audio processing method of claim 1, wherein the mapping is computed over an entire audible frequency range.

3. The audio processing method of claim 1, wherein the mapping is computed over a subset of an audible frequency range.

4. The method of claim 1, wherein the mapping involves minimizing a cost function including a first term that models how closely the intended perceived spatial position is achieved as a function of mapping an audio signal into loudspeaker signals, and a second term that assigns a cost to activating each of the loudspeakers.

5. The method of claim 4, wherein the cost of activating each loudspeaker is based, at least in part, on a function of the representation of loudspeaker signal level relative to the maximum playback limit.

6. The method of claim 1, wherein the representation of loudspeaker signal level relative to the maximum playback limit corresponds to one or more of a digital signal level, a limiter gain, or an acoustic signal level.

7. The method of claim 1, wherein the representation of loudspeaker signal level relative to the maximum playback limit is computed as a difference between a level estimate for each audio signal and playback limit thresholds for each loudspeaker.

8. The method of claim 7, wherein the level estimate for each audio signal is based, at least in part, on a zone-based rendering of all the audio signals.

9. The method of claim 7, wherein the level estimate for each audio signal is based, at least in part, on previously-computed loudspeaker signals.

10. The method of claim 9, wherein the level estimate for each audio signal is further dependent upon a participation of each loudspeaker in a plurality of spatial zones.

11. The method of claim 7, further comprising smoothing the level estimate for each audio signal across time, across frequency, or across both time and frequency.

12. The method of claim 7, wherein the mapping from audio signal to loudspeaker signals is determined by querying a data structure indexed by the intended perceived spatial position and level estimate for each audio signal.

13. The method of claim 7, wherein the mapping from audio signal to loudspeaker signals is determined by interpolating from a set of pre-computed speaker mappings, the set being indexed by the intended perceived spatial position and level estimate for each audio signal.

14. The method of claim 7, wherein the mapping from audio signal to loudspeaker is determined by interpolating from a set of pre-computed speaker mappings, the set being indexed by the intended level estimate for each audio signal.

15. The method of claim 12, wherein the level estimate for each audio signal is represented as a broadband gain multiplied with a spectral shape.

16. The method of claim 15, wherein the spectral shape is selected from a plurality of spectral shapes, each spectral shape of the plurality of spectral shapes corresponding to a content type.

17. The method of claim 1, wherein reducing a mapping into one loudspeaker and increasing a mapping into another loudspeaker occurs gradually as the representation of signal level relative to a maximum playback level increases above a threshold.

18. The method of claim 1, further comprising controlling a degree of reduction of mapping into one loudspeaker and an increase of mapping into another loudspeaker according to one or more of an audio format, a codec, or metadata.

19. The method of claim 1, further comprising controlling a degree of reduction of mapping into one loudspeaker and an increase of mapping into another loudspeaker according to a knee parameter.

20. The method of claim 1, wherein the intended perceived spatial position corresponds with a channel of a channel-based audio format, corresponds with metadata, or corresponds with both the channel and the metadata.

21. The method of claim 1, wherein approximately achieving the intended perceived spatial position of an associated audio signal involves minimizing a difference between a perceived spatial position and the intended perceived spatial position, given available loudspeakers and associated loudspeaker positions.

22. The method of claim 1, wherein approximately achieving the intended perceived spatial position of an associated audio signal involves minimizing a cost function.

23. An apparatus, the apparatus comprising:

an interface system configured to receive audio data, the audio data including one or more audio signals and associated spatial data, the spatial data indicating an intended perceived spatial position corresponding to an audio signal; and a control system configured to render the audio data for reproduction via a set of two or more loudspeakers of an environment, to produce loudspeaker signals, wherein:

rendering each of the one or more audio signals included in the audio data involves a mapping for each audio signal to the loudspeaker signals, the mapping being a time- and frequency-varying mapping, the mapping for each audio signal is computed as a function of an audio signal's intended perceived spatial position, physical positions associated with the loudspeakers and a time- and frequency-varying representation of loudspeaker signal level relative to a maximum playback limit of each loudspeaker, each mapping is computed to approximately achieve the intended perceived spatial position of an associated audio signal when the loudspeaker signals are played back over the set of loudspeakers located at associated loudspeaker positions, a representation of loudspeaker signal level relative to a maximum playback limit is computed for each audio signal as a function of one or more of the audio signals and their perceived spatial positions, and the mapping of an audio signal into a particular loudspeaker signal is reduced as the representation of loudspeaker signal level relative to a maximum playback limit increases above a threshold, while the mapping is increased into one or more other loudspeakers for which the representations of signal level relative to the maximum playback limits of one or more other loudspeakers are less than a threshold, wherein the control system is further configured to output loudspeaker signals to at least two loudspeakers of the set of loudspeakers of the environment.

24. One or more non-transitory media having instructions stored thereon for controlling one or more devices to perform the method of claim 1.

* * * * *